US012809740B2

(12) United States Patent
Ghag et al.

(10) Patent No.: US 12,809,740 B2
(45) Date of Patent: Nov. 24, 2026

(54) AUTOMATED SYSTEM AND METHOD FOR DETECTION AND REMEDIATION OF ANOMALIES IN ROBOTIC PROCESS AUTOMATION ENVIRONMENT

(71) Applicant: INFOSYS LIMITED, Bangalore (IN)

(72) Inventors: Sidharth Subhash Ghag, Pune (IN); Amit Govind Gaonkar, Pune (IN); Ananth Kumar Sadhanantham, Theni (IN); Pradeep Kumar Kondagula Suryanarayana, Bangalore (IN); Hasit Girish Trivedi, Pune (IN)

(73) Assignee: Infosys Limited, Bangalore (IN)

( * ) Notice: Subject to any disclaimer, the term of this patent is extended or adjusted under 35 U.S.C. 154(b) by 909 days.

(21) Appl. No.: 17/554,107

(22) Filed: Dec. 17, 2021

(65) Prior Publication Data

US 2023/0039566 A1 Feb. 9, 2023

(30) Foreign Application Priority Data

Jul. 28, 2021 (IN) ............................. 202141033943

(51) Int. Cl.
*G06F 11/34* (2006.01)
*G06F 11/07* (2006.01)
(Continued)

(52) U.S. Cl.
CPC ...... *G06F 11/3414* (2013.01); *G06F 11/0775* (2013.01); *G06F 11/079* (2013.01);
(Continued)

(58) Field of Classification Search
None
See application file for complete search history.

(56) References Cited

U.S. PATENT DOCUMENTS 10,397,236 B1 8/2019 Chandha et al.
11,373,131 B1 * 6/2022 Venugopal ....... G06Q 10/06395
(Continued)

FOREIGN PATENT DOCUMENTS

EP 3312725 A2 4/2018
WO 2013006708 A1 1/2013
WO 2019075399 A1 4/2019

OTHER PUBLICATIONS

Extended European Search Report, dated May 23, 2022.
Indian Application No. 202141033943, Examination Report, mailed Mar. 9, 2023.

*Primary Examiner* — Lanny N Ung
(74) *Attorney, Agent, or Firm* — Finnegan, Henderson, Farabow, Garrett & Dunner, LLP

(57) ABSTRACT

A method and/or system for automated detection and automated remediation of anomalies in Robotic Process Automation (RPA) environment is disclosed. The method comprises auto discovering resources (RPA components and its dependencies) in an RPA platform. The discovered resources are monitored though observation metrics whose values are obtained by executing pre-defined scripts. The obtained values are validated against threshold values to determine if there are any anomalies, wherein the threshold values may either be static values or dynamic values. If there is a breach of threshold, a remediation plan is automatically executed causing the remediation of anomalies. The system is trained to determine the dynamic threshold values through machine learning models which are developed and trained through metrics data and by determining error patterns from the historic unstructured log data.

11 Claims, 13 Drawing Sheets

(51) Int. Cl.
*G06F 11/30* (2006.01)
*G06N 20/00* (2019.01)

(52) U.S. Cl.
CPC ...... *G06F 11/0793* (2013.01); *G06F 11/3072* (2013.01); *G06N 20/00* (2019.01); *G06F 2201/81* (2013.01); *G06F 2201/865* (2013.01)

(56) References Cited

U.S. PATENT DOCUMENTS

| | | | | |
|---|---|---|---|---|
| 11,748,568 | B1 * | 9/2023 | Orhan | H04L 41/16 709/224 |
| 12,085,901 | B2 * | 9/2024 | Kothandaraman | H04L 41/5019 |
| 2010/0223497 | A1 * | 9/2010 | Schneider | G06F 11/3409 714/E11.023 |
| 2012/0323558 | A1 * | 12/2012 | Nolan | G06N 7/01 704/E11.001 |
| 2016/0285783 | A1 * | 9/2016 | Uriel | G06F 11/30 |
| 2017/0024285 | A1 | 1/2017 | Bell et al. | |
| 2018/0113773 | A1 * | 4/2018 | Krishnan | G06N 5/022 |
| 2018/0205593 | A1 | 7/2018 | Livschitz et al. | |
| 2021/0066141 | A1 * | 3/2021 | Phan | G06N 3/045 |
| 2021/0295203 | A1 * | 9/2021 | Liao | G06N 3/006 |
| 2022/0114044 | A1 * | 4/2022 | Singh | G06F 9/453 |
| 2022/0413956 | A1 * | 12/2022 | Mathew | H04L 43/16 |
| 2023/0018199 | A1 * | 1/2023 | Mahamuni | G06F 11/3051 |

* cited by examiner

EXEMPLARY METRIC MESSAGE

```
{
    "MetricMessages": [
        {
            "Application": "UiPath-Prod",
            "Description": "NA",
            "EventType": "Service",
            "MetricName": "Service Status",
            "MetricTime": "05/05/2021 05:18 AM",
            "MetricValue": "healthy",
            "ResourceId": "2_2_2",
            "ServerIp": "vmrsps-03",
            "Source": "System"
        }
    ]
}
```

FIGURE 3A

EXEMPLARY LOG DATA

```
[10/06/2016 11:31:37] Connecting to DB....
Creating query...
Executing query...
Retrieving results
[10/06/2016 11:31:42] getAttributes : send_iwd_notification :Y
[10/06/2016 11:31:45] "Attribute List Lenght =1 0002:34:17.858 0140 "
LaunchActivitySvcAsyncWaitXB@32481207
[10/06/2016 11:31:59] Connecting to DB....
Creating query...
Executing query...
Retrieving results
[10/06/2016 11:32:25] Connecting to DB....
Creating query...
Executing query...
Retrieving results
[10/06/2016 11:32:55] Web Service invoker encountered an error
while invoking the Web Service. Reason: HTTP/1.1 504 Gateway
Time-out # s_m_xyz
```

FIGURE 3B

| ERROR EXAMPLE | ERROR PATTERN | REGEX | JOB |
|---|---|---|---|
| 1 | Error truncating target table ***** [Error executing truncate target table query: TRUNCATE TABLE ***** # ***** | (\QError\E)([ ]+)(\Qtruncating\E)([ ]+)(\Qtarget\E)([ ]+)(\Qtable\E)([ ]+)(.*)(\Q[Error\E)([ ]+)(\Qexecuting\E)([ ]+)(\Qtruncate\E)([ ]+)(\Qtarget\E)([ ]+)(\Qtable\E)([ ]+)(\Qquery:\E)([ ]+)(\QTRUNCATE\E)([ ]+)(\QTABLE\E)([ ]+)(.*)(\Q#\E)([ ]+)(.*) | Trade_Data_Recon_JOB<br>\\US.TradComp.com\Trade\workflow_logs\Trade_Data_Recon_JOB.log |
| 2 | [ERROR] Web Service invoker encountered an error while invoking the Web Service. Reason: Operation timed out after 140000 milliseconds with 0 bytes received # ***** | (\Q[ERROR]\E)([ ]+)(\QWeb\E)([ ]+)(\QService\E)([ ]+)(\Qinvoker\E)([ ]+)(\Qencountered\E)([ ]+)(\Qan\E)([ ]+)(\Qerror\E)([ ]+)(\Qwhile\E)([ ]+)(\Qinvoking\E)([ ]+)(\Qthe\E)([ ]+)(\QWeb\E)([ ]+)(\QService.\E)([ ]+)(\QReason:\E)([ ]+)(\QOperation\E)([ ]+)(\Qtimed\E)([ ]+)(\Qout\E)([ ]+)(\Qafter\E)([ ]+)(\Q140000\E)([ ]+)(\Qmilliseconds\E)([ ]+)(\Qwith\E)([ ]+)(\Q0\E)([ ]+)(\Qbytes\E)([ ]+)(\Qreceived\E)([ ]+)(\Q#\E)([ ]+)(.*) | Commodity_Regulatory_Reporting_JOB<br>\\US.TradComp.com\Commodity\workflow_logs\Commodity_Regulatory_Reporting_JOB.log |

FIGURE 3C

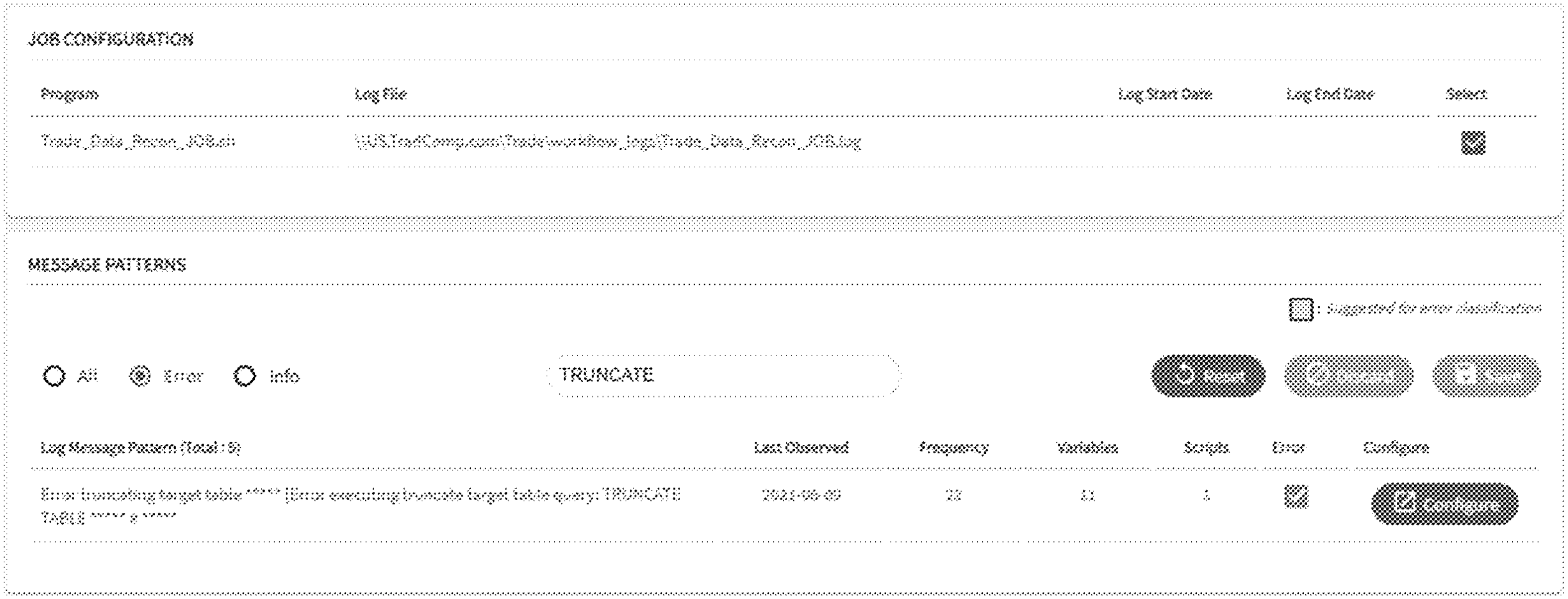

FIGURE 3D

AUTOMATED SYSTEM AND METHOD FOR DETECTION AND REMEDIATION OF ANOMALIES IN ROBOTIC PROCESS AUTOMATION ENVIRONMENT

This application claims the benefit of Indian Patent Application Serial No. 202141033943 filed Jul. 28, 2021, which is hereby incorporated by reference in its entirety.

FIELD

The present technique relates to Robotic Process Automation (RPA). More specifically, the technique relates to automated real-time monitoring of operation in Robotic Process Automation (RPA) environments

BACKGROUND

Robotic Process Automation (RPA) is about using 'robots' or the 'bots' to handle repetitive, rule-based digital tasks. RPA bot is a form of intelligent software. RPA deployment in enterprises is fragmented with multiple regions, multiple line of operations, multiple RPA technologies, multiple Control Towers which lead to situation where it is difficult to operate and manage. To scale up digitization program effectively, organizations need to consider early on support requirements for bots. Lack of visibility, high volume of operation failures, fragmented problem management, failing to plan for operation continuity are likely to lead to problems in digitization implementation, inflated expenses, and process failures. To keep up with scalability demands of digitization and managing the demand to support bots, one needs to address key questions such as how to manage and make sure RPA bots are available and performing correctly; how to automate the remediation steps when things go wrong; and how to protect automation investment.

Currently, the support models around the RPA system is primarily incident driven. If the bot or any of its dependencies fail, then an incident is raised and then the support team gets the request assigned who then follows Standard Operating Procedures (SOPs) to investigate, diagnose and subsequently either resolves the issue or if unable to resolve then re-assign it to a relevant team who will be able to resolve the issue. The time taken to bring any of the unhealthy RPA components such as bots, Control Tower etc. into an operationally healthy state could take anywhere between several minutes to hours or even days in some rare cases which could lead to disruptions. Some of the reasons for inability to bring back RPA systems into a healthy state faster could be—(a) delayed reporting of operational health; (b) lack of past knowledge in ability to resolve similar issues; (c) low visibility of all dependent components such as infrastructure, Control Towers, bots etc.; and/or (d) unavailability of support engineers to continuously monitor as they may be multi-tasking or working on some other activity.

Currently, some of the approaches are—Subject Matter Expert (SME) support-based approach (manual) and traditional script-based approach (low automation). In case of SME support-based approach, SME will keep manually viewing the Control Tower dashboards for any issues in the RPA systems. If any issue is reported, then either ticket will be raised by the SME or the SME will go ahead to resolve the issue. Not all components of RPA platform are monitored by the SME—some of the IT components such as servers, VMs, databases may be monitored by different specialized teams. This results in organization getting a siloed view of RPA operations in production. Also, if the issue resolution crosses support boundaries of different teams, then the resolution times could be higher as multiple teams would then need to work together to diagnose the root cause of the issue and apply fixes.

In case of traditional script-based approach, support teams develop various scripts (for example—Powershell) to monitor different RPA components and then report any issues, based on pre-defined logic embedded into code over emails. These scripts are then scheduled in some task scheduler/cron job to run at periodic intervals to monitor RPA components and report state of the components. Some of the shortcomings with this approach are—(a) approach is difficult to scale in large RPA deployments. As RPA deployment grows, managing the scripts by manually configuring them for any new RPA component can be very tedious. Also, any change in the scripts can lead to a high management effort; (b) since the RPA platform is not proactively tracked for any configuration level changes, the monitoring can easily tend to go out of sync. If any component of the RPA platform is decommissioned and the scripts tracking that components are not updated, it may result in large number of false alerts being raised by the monitoring scripts; (c) They are usually characterized by simple single component monitoring and reporting sometimes with simple logic-based check embedded in code to detect anomalies. Such scripts are found to lack ability to diagnose or troubleshoot for root causes in case of issues which are complex in nature which requires analyzing log files or issues in other dependent components; and (d) scripts need to be re-configured and modified for every different instance of the RPA platform deployed in the organization.

SUMMARY

As highlighted in the background section, in SME support-based approach (manual), if a server in the RPA environment needs to be monitored (for example) then the SME manually checks if servers are accessible, bot can run and perform required task. In case of bot monitoring (for example), bot status (active/disabled/deleted), last run status, error messages, average response time, SLA validations are checked manually. In case of services monitoring, the SME manually checks whether all required services are running on servers, all required services are running on client machines and restart the service if any service is not running/functioning.

In addition to problems mentioned in the background section, the existing systems lack self-healing/corrective actions based on proactive tracking. Also, the existing systems are usually characterized by simple single component monitoring and reporting sometimes with simple logic-based check embedded in code to detect anomalies. Such scripts are found to lack ability to diagnose or troubleshoot for root causes in case of issues which are complex in nature which requires analyzing log files or issues in other dependent components. The technology described in the present disclosure overcomes the above-mentioned technical problem through a system for automated detection and automated remediation of anomalies in a Robotic Process Automation (RPA) environment. The disclosed technology addresses the technical problem through a technical solution by moving from reactive to proactive approach of Managing RPA Platforms by having an end-to-end visibility of the health of all RPA components and their dependencies, proactively detect anomalies in any monitoring parameter or logs and then take corrective automated actions to bring back any non-working, unhealthy RPA component or its dependencies into a working, healthy state. The system continuously monitors RPA platforms and its dependent ecosystem, diagnoses failure of RPA components and promptly execute the remediation action to resolve the issue and notify the respective team about the failure and remediation action taken against those failures. The RPA has various components like Control tower, Bot creator, Bot Runner, Database, RPA services, Database services, Servers, Virtual Machines, computer network, etc. and all these components have to be monitored continuously to ensure that the bots are running smoothly in the deployed RPA environments. The disclosed technology comprises various aspects such as monitoring which comprises health dashboard for RPA components, automated anomaly detection, and alerts and notification; self-healing aspects such as remedial plans (also referred as remediation action plans), automated execution of remedial plans and script repository; and analytics aspects comprising bot performance dashboard. Through the disclosed technology, the administrator/user may perform bot registry and onboarding, access management and RPA component configuration.

Disclosed are a system, a method and/or non-transitory computer readable storage medium for automated detection and automated remediation of anomalies in a Robotic Process Automation (RPA) environment.

In one aspect, a computer implemented method for automated detection and automated remediation of anomalies in a Robotic Process Automation (RPA) environment is disclosed. The method comprising, discovering one or more resources in an RPA platform. The discovered one or more resources on the RPA platform is monitored, wherein the monitoring comprises—determining values of one or more observation metrics from the one or more resources in the RPA platform; and detecting at least one anomaly by validating the values of the one or more observation metrics. The determination of the values of the one or more observation metrics comprises, querying the one or more observation metrics of the one or more resources and at least one script associated with each of the one or more metrics; executing the at least one script to fetch the values of the one or more observation metrics from the one or more resources; and generating a metric message comprising the values for each of the one or more observation metrics. The detection of the at least one anomaly, comprising, parsing the metric message to obtain values of the one or more observation metrics; comparing the values of the one or more observation metrics against a threshold value for each of the one or more observation metrics; and determining the values of the one or more observation metrics as an anomaly when the values of the one or more observation metrics breach the threshold value.

The threshold value may either be a deterministic threshold value or non-deterministic threshold value, wherein the deterministic threshold value may be defined by a user and non-deterministic threshold may be determined by trained machine learning models. The detected at least one anomaly is remediated by identifying at least one automated remediation action comprising sequence of instructions and executing the identified at least one automated remediation action causing the remediation of the detected at least one anomaly. The steps of training machine learning models may comprise, receiving metrics data from metrics data store and historic unstructured log data from log data store; converting the metrics data and the historic unstructured log data to a structured format data; extracting error patterns from the structured format data; and providing the extracted error patterns as input to the machine learning models to train the machine learning models.

In another aspect, a system for automated detection and automated remediation of anomalies in a Robotic Process Automation (RPA) environment is disclosed. The system comprising one or more components, but not limited to at least one processor and at least one memory unit operatively coupled to the at least one processor, having instructions stored thereon that, when executed by the at least one processor, causes the at least one processor to discover one or more resources in an RPA platform. The discovered one or more resources on the RPA platform is monitored, wherein the monitoring comprises—determining values of one or more observation metrics from the one or more resources in the RPA platform; and detecting at least one anomaly by validating the values of the one or more observation metrics. The determination of the values of the one or more observation metrics comprises, querying the one or more observation metrics of the one or more resources and at least one script associated with each of the one or more metrics; executing the at least one script to fetch the values of the one or more observation metrics from the one or more resources; and generating a metric message comprising the values for each of the one or more observation metrics. The detection of the at least one anomaly, comprising, parsing the metric message to obtain values of the one or more observation metrics; comparing the values of the one or more observation metrics against a threshold value for each of the one or more observation metrics; and determining the values of the one or more observation metrics as anomaly if the values of the one or more observation metrics breach the threshold value.

The threshold value may either be a deterministic threshold value or non-deterministic threshold value, wherein the deterministic threshold value may be defined by a user and non-deterministic threshold may be determined by trained machine learning models. The detected at least one anomaly is remediated by identifying at least one automated remediation action comprising sequence of instructions and executing the identified at least one automated remediation action causing the remediation of the detected at least one anomaly. The steps of training machine learning models may comprise, receiving metrics data from metrics data store and historic unstructured log data from log data store; converting the metrics data and the historic unstructured log data to a structured format data; extracting error patterns from the structured format data; and providing the extracted error patterns as input to the machine learning models to train the machine learning models.

In yet another aspect, a non-transitory computer readable storage medium for automated detection and automated remediation of anomalies in a Robotic Process Automation (RPA) environment is disclosed. The non-transitory compute readable storage medium comprising machine executable code which when executed by at least one processor, causes the at least one processor to perform steps such as, discovering one or more resources in an RPA platform. The discovered one or more resources on the RPA platform is monitored, wherein the monitoring comprises—determining values of one or more observation metrics from the one or more resources in the RPA platform; and detecting at least one anomaly by validating the values of the one or more observation metrics. The determination of the values of the one or more observation metrics comprises, querying the one or more observation metrics of the one or more resources and at least one script associated with each of the one or more metrics; executing the at least one script to fetch the values of the one or more observation metrics from the one or more resources; and generating a metric message comprising the values for each of the one or more observation metrics. The detection of the at least one anomaly, comprising, parsing the metric message to obtain values of the one or more observation metrics; comparing the values of the one or more observation metrics against a threshold value for each of the one or more observation metrics; and determining the values of the one or more observation metrics as anomaly if the values of the one or more observation metrics breach the threshold value.

The threshold value may either be a deterministic threshold value or non-deterministic threshold value, wherein the deterministic threshold value may be defined by a user and non-deterministic threshold may be determined by trained machine learning models. The detected at least one anomaly is remediated by identifying at least one automated remediation action comprising sequence of instructions and executing the identified at least one automated remediation action causing the remediation of the detected at least one anomaly. The steps of training machine learning models may comprise, receiving metrics data from metrics data store and historic unstructured log data from log data store; converting the metrics data and the historic unstructured log data to a structured format data; extracting error patterns from the structured format data; and providing the extracted error patterns as input to the machine learning models to train the machine learning models.

The method, the system, and/or the non-transitory computer readable storage medium disclosed herein may be implemented in any means for achieving various aspects and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 3A illustrates an exemplary metric message, according to one or more embodiments.

FIG. 3B illustrates an exemplary historic unstructured log data, according to one or more embodiments.

FIG. 3C illustrates exemplary error patterns, regular expressions to identify error patterns and the respective log files, according to one or more embodiments.

FIG. 3D illustrates a user interface where the system has identified error patterns based on the regular expressions, according to one or more embodiments.

Figure 1:
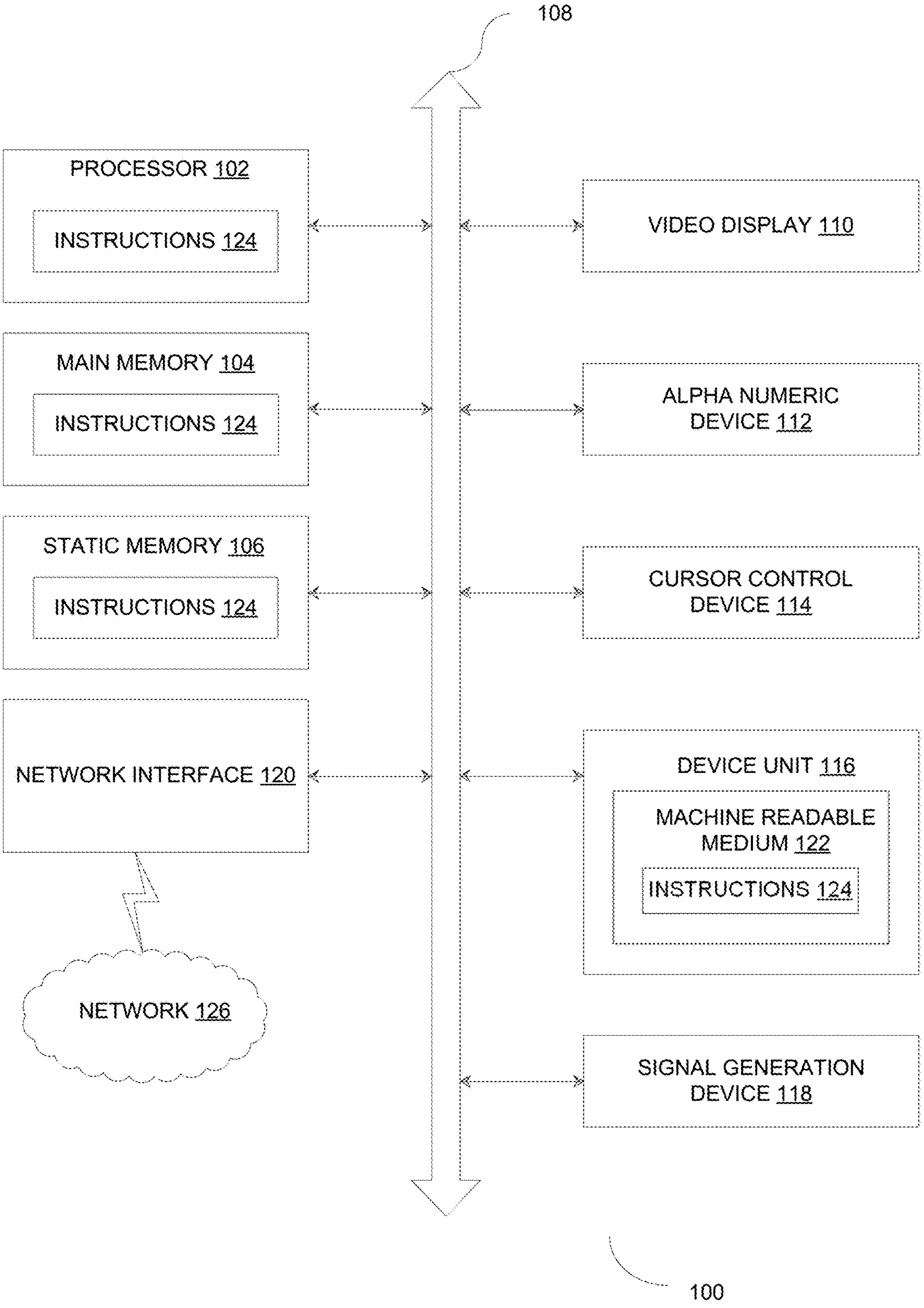
FIG. 1 is a diagrammatic representation of a data processing system capable of processing a set of instructions to perform any one or more of the methodologies herein, according to one or more embodiments.

Other features of the present embodiments will be apparent from the accompanying drawings and from the detailed description that follows.

DETAILED DESCRIPTION

Examples of this technology provide a number of advantages, such as overcoming the technical problem mentioned in the background section through a system and/or method for automated detection and automated remediation of anomalies in a Robotic Process Automation (RPA) environment which ensures end-to-end monitoring of the RPA platform and its components along with their dependencies and automatically restore any unhealthy component to a healthy state in the shortest possible time in order to minimize operational disruptions.

If one considers the typical day in the life of support personnel managing RPA operations—IT administrator may track alerts raised by monitoring tools which monitor various IT components of an RPA environment such as servers, VMs, computer networks etc. Database administrator may monitor performance and availability of RPA databases. RPA administrator may monitor the RPA operations which includes bots, queues, scheduling etc. In large enterprises, the walls between them often lead them to lose sight of big picture. The issues in the infrastructure may be, but not limited to server down, high memory consumption, low disk space, VMs not connecting etc. Some of the issues with databases may be DB service down, high Program Global Area (PGA) memory usage, high file system usage, blocked user transactions etc. Some issues with RPA bots may be Control Tower service down, scheduler issue, bot deployment failure, bot SLA breach etc. Typical challenges faced in such environment are—low visibility, need of experts in some situations and/or higher mean-time-to-recovery (MTTR) rates. The technology described in the present disclosure overcomes the above-mentioned problems with clear sighted intelligent self-healing operation of all components in the RPA environment.

Some of the key aspects of the disclosed system are monitoring RPA components, self-healing in case of anomaly and generation of analytics which provides the ability to manage any RPA operation by having a complete end-to-end view of RPA components and dependencies right from low level infrastructure components such as servers, VMs, etc. to RPA components such as Control Tower, bots, services, and databases. The disclosed technology will perform root cause analysis on the operating metric/logs and take prompt remedial actions to bring unhealthy RPA components into a healthy state or proactively notify SMEs for prompt remedial fixes through manual means. The disclosed technology is capable of tracking baseline environment changes and then periodically assess them from any deviations which could lead to disruptions in operations in the RPA environment.

In one or more embodiments, a method, system and/or computer readable storage medium for automated detection and automated remediation of anomalies in a Robotic Process Automation (RPA) environment is disclosed. One or more RPA platforms and computing devices communicatively coupled to the one or more RPA platforms together forms an RPA environment. The method comprising, discovering one or more resources in an RPA platform. The discovered one or more resources on the RPA platform may be monitored and the steps comprising, determining values of one or more observation metrics from the one or more resources in the RPA platform; and detecting at least one anomaly by validating the values of the one or more observation metrics. The determination of the values of the one or more observation metrics comprises, querying the one or more observation metrics of the one or more resources and at least one script associated with each of the one or more metrics; executing the at least one script to fetch the values of the one or more observation metrics from the one or more resources; and generating a metric message comprising the values for each of the one or more observation metrics. The detection of the at least one anomaly, comprising, parsing the metric message to obtain values of the one or more observation metrics; comparing the values of the one or more observation metrics against a threshold value for each of the one or more observation metrics; and determining the values of the one or more observation metrics as anomaly if the values of the one or more observation metrics breach the threshold value.

The threshold value may either be a deterministic threshold value or non-deterministic threshold value, wherein the deterministic threshold value may be defined by a user and non-deterministic threshold may be determined by trained machine learning models. The detected at least one anomaly is remediated by identifying at least one automated remediation action comprising sequence of instructions and executing the identified at least one automated remediation action causing the remediation of the detected at least one anomaly. The steps of training machine learning models may comprise, receiving metrics data from metrics data store and historic unstructured log data from log data store; converting the metrics data and the historic unstructured log data to a structured format data; extracting error patterns from the structured format data; and providing the extracted error patterns as input to the machine learning models to train the machine learning models.

FIG. 1 is a diagrammatic representation of a machine and/or data processing device capable of processing a set of instructions to perform any one or more of the methodologies herein, according to one embodiment. The machine and/or the data processing device in the example form, comprises a computer system 100 within which a set of instructions, for causing the machine to perform any one or more of the methodologies discussed herein, may be executed. In various embodiments, the machine operates as a standalone device and/or may be connected (e.g., networked) to other machines.

A machine may be a personal computer (PC), laptop or an embedded system and/or any machine capable of executing a set of instructions (sequential or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD), Light Emitting Diode display (LED) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker), and a network interface 120.

The disk drive unit 116 includes a machine-readable medium 122 on which is stored one or more sets of instructions 124 (e.g., software) embodying any one or more of the methodologies and/or functions described herein. The instructions 124 may also reside, completely and/or at least partially, within the main memory 104, within the static memory 106 and/or within the processor 102 during execution thereof by the computer system 100, the main memory 104 and the processor 102 also constituting machine-readable media.

The instructions 124 may further be transmitted and/or received over a network 126 via the network interface 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is configured for storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical media, and magnetic media.

Figure 2:
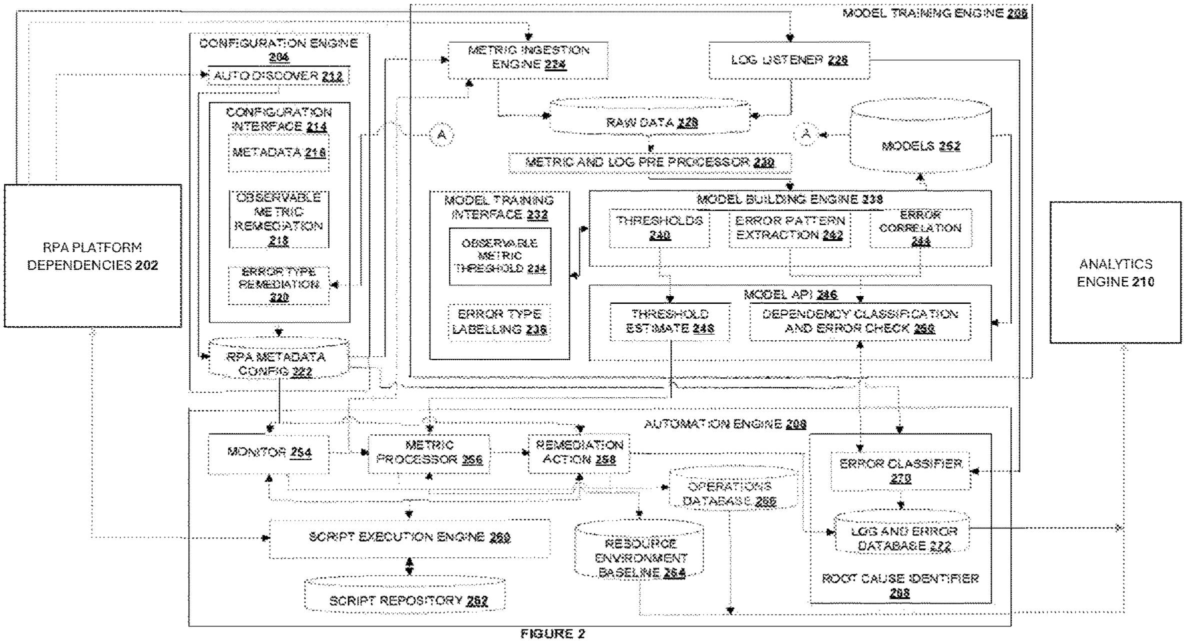
FIG. 2 is an architecture diagram of system for automated detection and automated remediation of anomalies in a Robotic Process Automation (RPA) environment, according to one or more embodiments.

FIG. 2 is a system for automated detection and automated remediation of anomalies in a Robotic Process Automation (RPA) environment, according to one or more embodiments. In one or more embodiments, the system may comprise one or more components such as, but not limited to RPA platform 202, a configuration engine 204, a model training engine 206, an automation engine 208 and an analytics engine 210. The configuration engine 204 may comprise one or more components such as, but not limited to, an auto discover engine 212, a configuration interface 214 and RPA metadata configuration database 222. The configuration interface 214 may comprise one or more components such as, but not limited to, metadata 216, observable metric remediation 218 and error type remediation 220.

In one or more embodiments, the training engine 206 may comprise one or more components such as, but not limited to, metric ingestion engine 224, log listener 226, raw data storage device 228, metric and log pre-processor 230, model training interface 232, model building engine 238, model API 246 and models storage device 252. The model training interface 232 may comprise observable metric threshold configuration module 234 and error type labelling module 236. The model building engine 238 may comprise thresholds module 240, error pattern extraction engine 242, error correlation engine 244. The model API 246 may comprise threshold estimate API 248 and dependency classification and error check API 250.

In one or more embodiments, the automation engine 208 may comprise one or more components such as, but not limited to, monitor module 254, a metric processor 256, a remediation action module 258, script execution engine 260, a script repository 262, resource environment baseline storage device 264, an operations database 266 and root cause identifier 268. The root cause identifier 268 may comprise components such as, but not limited to error classifier 270 and log and error database 272. The working of each of the mentioned components and the communication between each of them is described in detail in subsequent paragraphs of the present disclosure.

In one or more embodiments, configuration engine 204 may be configured to initiate the process of automated detection and automated remediation of anomalies by onboarding RPA components and all its dependent components on the RPA platform 202, which are to be managed by the system. An exemplary RPA platform may be 'Automation Anywhere' or any such platform which provides RPA functionalities/services. Exemplary RPA components may be a Control Tower, a bot runner, bots etc. Exemplary dependent components may be Virtual machines (VMs), servers, infrastructure resources such as memory/storage devices and middleware such as web servers, database etc. Both the RPA component and the dependent components may together be termed as RPA resources. The process executed by configuration engine 204 may either be automated or manually performed by a user through configuration interface 214. As a part of onboarding of RPA components and all the dependent components, the auto discover engine 212 may be configured to execute an auto discovery process, which may load the details of RPA components and the dependent components by connecting with RPA platform 202 and querying the RPA components through RPA provided APIs or database to discover the various RPA components onboarded/installed in the RPA environment.

In one or more embodiments, broadly, the onboarding process may comprise steps such as auto discovery process and activate process. As a part of auto discovery process, attributes of all the RPA components in the RPA platform may be extracted. The access of all the RPA component to the RPA platform may be verified by way of web API or direct call to database. Before initiating the auto-discovery, the system may request user to provide access credentials (username and password) in case of API or the database credentials (username and password) in case of call to database. The system may then use these credentials to check access permission before initiating auto discovery process. Further, access to other RPA components requires RPA admin to grant permission to the credentials which may be used by the system to query RPA components for verification checks. One or more monitoring and remediation action plans may be set up by the user as a part of initial configuration by the user. The 'activate' process may comprise steps such as configuring credentials for script execution and other parameters, activating the monitoring task and activating remediation plans for the RPA components, and review the RPA resources which are up and functioning.

The auto discovery process may extract the attributes (also referred as metadata configurations or metadata 216) for each of the discovered RPA components such as, but not limited to bot name, bot location, server IP address, database IP address, connection string of database, Control Tower IP address, bot runner, VM component details etc. which may be used for monitoring and remedial actions by the system in the disclosed technology. The extracted attributes may be stored in the RPA metadata configuration database 222. The auto discover engine 212 may be configured to execute auto discovery process continuously or periodically which will ensure that stored RPA metadata configuration are in sync with the environment of the RPA platform that is being managed. The configuration interface 214 may be configured to display attributes of all the RPA components and dependent components to the user. The user may add, modify, or delete any RPA components and/or configurations related to RPA components and the dependent components. Each RPA component and the dependent components may be identified and termed as 'resources'. Each of the resources may have relationship (communicatively coupled) with other resources and which may be modelled using the configuration interface 214. Each of the resources may be monitored/observed on various parameters which are termed as 'observables' (also termed as 'observable metrics' or 'observation metrics').

In one or more embodiments, the observables may be monitored for anomalies based on Anomaly Detection techniques, wherein one of the techniques is using thresholds (or thresholding models or threshold models). In the thresholding models, threshold values for the metrics are used by the system to identify anomalies in the behavior of the metrics being monitored. These threshold values may either be static (rule-based, also referred as 'deterministic') i.e. same value in any operating condition with an assumption that no underlying environment variability will have an impact on the resource behavior; or dynamic (or adaptive, also referred as 'non-deterministic') where threshold values are computed dynamically for parts of the larger dataset which have dependency on underlying dependent variables such as time of the day, transaction volume, CPU utilization, etc. which may impact the behavior of the resources. For example, if CPU utilization value is greater than 75%, it may be considered as breach if the threshold is set as 75%, which is a rule-based threshold. In case of dynamic threshold, the value of the metric may be derived from other operating parameters in the environment. For example, say during a certain period of the last 3 months historical data, the system has learned that CPU utilization on Thursdays at 6 PM is usually 40%, whereas CPU utilization on Thursdays at 10 AM is 70%. These CPU utilization values are learned by a machine learning system based on parameters which in this case being 'day of the week' and 'time'. So, the value of CPU utilization may change in the future based on operations and system will automatically learn about this change in CPU utilization by understanding the day of the week/time metric of the past historical data.

In one or more embodiments, the configuration engine 204, through configuration interface 214 may allow user to configure the remediation action plans, after the RPA components and the dependent components are onboarded. A Remediation Action Plan may be a single action step or series of action steps which the system will execute to resolve a particular anomaly. An action may be a script (set of instructions) or a workflow which may be fetched from a centralized script repository 262 and the scripts are linked with the appropriate Remediation Action Plan. Once the remediation action plans are defined, user can map them to either observable metrics and store as observable metric remediation 218; or map them to error type and store as error type remediation 220. Both the variants of anomalies, i.e., any anomaly detected due to a threshold breach in the observable metrics and anomaly detected due to errors identified in log data can be linked with one or more Remediation Action Plan through the configuration interface 214. Table 1 illustrates an exemplary mapping of observable metrics that needs to be monitored by the system and the respective Remediation Action Plan to be executed automatically if anomaly is detected while monitoring the RPA components by the system.

TABLE 1

Exemplary mapping of monitoring plan related to observable metrics and the respective Remediation Action Plan

| Monitoring Plan | Remediation Plan |
|---|---|
| Check Orchestrator Status | Server Up Status Check |
| Check Robot Status | Server Up Status Check |
| Check Service Status | Start Service |
| Check Job Status | Start Job |
| Check Job Execution Time | Manual Remediation |
| Check DB Server Status | Server Up Status Check |
| Check Service Status | Start Service |

In one or more embodiments, the model training engine 206 may be configured to ingest data such as metrics data and historic unstructured log data and train the machine learning models. The metric ingestion engine 224 may be configured to receive historical metrics data from metrics data store associated with the RPA platform 202 through enterprise monitoring systems. The metric ingestion engine 224 may also be configured to receive attributes that are stored in the RPA metadata configuration database 222, and observable metrics data from automation engine 208 (described in subsequent paragraphs). The log listener 226 may be configured to receive historic unstructured log data such as, but not limited to event logs, application logs etc. from the log data store associated with RPA platform 202. The data received at the metric ingestion engine 224 and log listener 226 may be stored in the raw data store 228 which may be converted into a structured format data by the metric and log pre-processor 230. The metric and log pre-processor 230 may be configured to receive raw data from the raw data store 228 and convert it to structured format data by applying transformation/aggregate functions to prepare data for model training. As the raw data may be in the form of structured or unstructured format, the metric and log pre-processor 230 may extract features/values and convert into a format which can be used for model training. Transformation/Aggregate functions are part of the feature extraction and may be performed using data wrangling techniques which is a process of transforming and mapping data from one raw form to another format. After the conversion of raw data into a structured format data, the data points in the structured format data which are in the form of metrics and error patterns may be used to train or create models by the model building engine 238.

In one or more embodiments, the model building engine 238 may be configured to receive data in the structured format from the metric and log pre-processor 230. The thresholds 240 may be either static thresholds or adaptive thresholds. In one or more embodiments, the model building engine 238 may be configured to receive inputs from user/SMEs through model training interface 232 which allows user/SMEs to define static thresholds and also configure/tune the adaptive threshold as well as label error types. The observable metric threshold configuration module 234 may receive inputs from user which allows the user to define/setup a static threshold, and/or select model algorithms in case of dynamic threshold and define model algorithms to be used for the observables being monitored.

For adaptive thresholds, algorithms such as Linear Regression, Exponential Weighted Moving Average etc. may be used to generate the adaptive threshold models for each resource/observable metric to be monitored by the system. Linear Regression is a linear approach for modelling the relationship between scalar response and one or more explanatory variables (also known as dependent and independent variables). For example, a scalar response variable may be 'bot completion time' and explanatory variable may be—'number of records processed' and 'day of the week'. Now, using multiple Linear Regression, since there are two explanatory variables, the relationships are modelled using linear predictor functions whose unknown model parameter (estimated completion time) is predicted by the model building engine 238. Weighted Moving Average comprises calculation to analyze data points by creating a series of averages of different subsets of the full data set. Each RPA component and its respective observables (or observable metrics) such as, but not limited to bot queue length, bot completion time etc. may have a threshold value/range computed using the above-mentioned technique. A model can be trained for a particular resource observable metric on different variables such as time of day, number of records to be processed by the bot etc. to predict the threshold value which could be in terms of bot queue length, bot processing time etc. Also, the model building engine 238 may receive user input from model training interface 232 through observable metric threshold configuration module 234 to tune the dynamic threshold parameters.

On the log pattern analysis, transactions from log data of the RPA components being monitored may be passed through the error pattern extraction engine 242 to perform log analytics which can use algorithms such as Longest Common Subsequent algorithm to automatically generate error patterns. These error patterns can then be reviewed by an SME to label as an error type using error type labelling module 236 through the model training interface 232, which can be persisted and used by the system for notifying the root cause of the issue to the users or take corrective actions without human intervention. Further, the error correlation engine 244 may perform correlation-based training on error transactions to have a better understanding of any other related errors which may be occurring in other components (those without direct/immediate dependencies) that may be the root cause of the issue or failure of any RPA resource.

The error type labeling module 236 may receive inputs from user which allows the user to mark/identify patterns identified by the error pattern extraction engine 242 as errors. This will help the system to learn from this labeling and use the captured knowledge to be leveraged for other RPA components where similar errors may occur. Once the models are built and trained, they are published and exposed as API which can be used by the automation engine 208 at runtime. Using the resource observable metric threshold estimate API 248, the model can predict the estimated threshold value for a particular resource/observable metric based on the input parameters passed. Through the dependency classification and error check API 250, the model may verify if a log transaction extracted from a log file for a specific RPA resource is a labeled error type and will also return details of potential root cause found in other resources which have been found to be correlated very close in the past. The generated and trained models may be stored in the models storage device 252. As, the models storage device 252 may be communicatively coupled to the configuration interface 214, it may allow user to associate an error type with remediation action at the configuration interface 214. After the configurations of all RPA components and its dependencies, and creation of models based on historical data available from the RPA systems, the automation engine 208 may monitor and detect anomalies.

In one or more embodiments, even if the models have not been created due to non-availability of historical data, the automation engine 208 may still perform the monitoring, anomaly detection and remediation based on static thresholds and root cause analysis may be executed using regex (regular expression) rules for error pattern detection which may be either configured by the user or automatically detected by the system.

In one or more embodiments, the automation engine 208 may be configured to monitor the RPA components and all the dependent components using the monitor module 254, detect anomaly using the metric processor 256, and remediate the detected anomaly using the remediation action module 258. The monitoring may either be a scheduled monitoring or a triggered monitoring, wherein the monitoring may monitor/scan resources based on observable metrics such as, but not limited to bot runtime, bot queue length, virtual machine CPU utilization, Control Tower service status etc. In case of triggered monitoring, the monitoring may be triggered by receiving inputs from a user through an upstream system such as custom apps/software or IT service management applications/software. In case of scheduled monitoring, the monitoring engine 208 may extract multiple data points from the resources being monitored from the RPA metadata configuration database 222 which comprises extracted attributes as a part of auto discovery periodically with intervals as defined by the user, for example, collecting list of software installed on the RPA platform/environment, version information of installed software, date of install/update on a server/VM resource etc. to perform verification of any changes in resource environment. Some of the common reasons for failure of bots in an RPA environment is change in the installed application, changes in the configuration, as any change in such aspects cause the bot script logic to fail. Hence updates on such environment changes will help operations team to prevent bot failures more proactively.

In both the scenarios of triggered monitoring and scheduled monitoring, the monitor module 254 may fetch the observable metrics configured for each resource from the RPA metadata configuration database 222. Since the health check or monitoring of RPA components are driven through configurations, the user/administrator may enable or disable the health check for specific RPA components centrally rather than enabling or disabling at individual script levels. To execute a specific observation health check based on which RPA platform needs to be monitored, the monitor module 254 will query the RPA metadata configuration database 222 to identify the list of RPA components that needs to be monitored and the associated observable metrics, and then identify the script which needs to be executed. The Script ID of the identified script may then be passed to the script execution engine 260 along with the attributes, for example server name/IP address, user credentials in case of server to be monitored. It is to be observed that mapping of Script ID may be performed by the user through the configuration interface 214 as a part of initial setup/configuration as described in previous paragraphs of the present disclosure. The script execution engine 260 may fetch the script from the script repository 262 using the Script ID and execute the scripts centrally, by sending one or more instructions to RPA platform 202 to obtain values for the observable metrics (for example, CPU utilization, response time etc.). Once the script is executed, the script execution response parameters are returned to the script execution engine 260 and then to the monitor module 254 to prepare the metric message. The metric message may be in a text format comprising observable metrics and values for each of the observable metrics. Each health check executed by the monitor module 254 may generate a metric message containing the details of the observable metrics and the details of resources for which the observations have been made. The metric message may then be communicated to the metric processor 256 either synchronously or asynchronously. In a synchronous communication, the monitor module 254 may send metric message to the metric processor 256 and then wait for the response from metric processor 256 before proceeding to send the next metric message. In asynchronous communication, the monitor module 254 may keep sending generated metric message to metric processor 256 and not wait for success/error response before sending the subsequent error metric message. In case of asynchronous communication, the monitor module 254 may reconcile the status of posted metric message offline through separate process. It is to be observed that the metrics that are obtained as response from the RPA platform 202 through script execution engine 260 may be communicated to metric ingestion engine 224 for training the models.

In one or more embodiments, the metric processor 256 may detect anomalies in the values obtained for the observable metrics such as bot status, bot queue length etc. and may also detect anomalies in category/collection i.e., a data structure containing a list of data items such as applications installed in the RPA platform 202 compared to the baseline software list stored in the RPA resource environment baseline storage device 264.

In one or more embodiments, the metric processor 256 may parse the metric message received from the monitor module 254 and extract the configuration data in terms of metric values in the message from the metric message. The metric processor 256 may execute anomaly detection on the metric values. Anomaly may be detected by validating the metric values against a threshold value. The threshold value may either be a static threshold value/range as configured through the Threshold rule configuration UI (i.e., observable metric threshold configuration module 234) or may be retrieved dynamically by invoking the "Resource Observable Metric Threshold Estimate" API (i.e., threshold estimate API 248) which uses the adaptive threshold model to predict a dynamic threshold value. In other embodiments, the static thresholds may also be exposed as APIs which are accessed by the metric processor 256. If the validation determines that if there is a breach of threshold, then the captured observable metric may be marked as an anomaly and an event/alert may be raised to take further actions which could be sending out a notification to users and/or triggering an automated remediation process as configured. If there is no breach of threshold, no action may be taken and the metric processor 256 may assess the next observable metric in the queue. It is to be observed there may be either upper threshold or lower threshold or both upper and lower thresholds for some of the observable metrics. For some observable metrics, the values of observable metrics below a threshold value may also be considered as breach of threshold. In case of static threshold, the system may allow user to define both the upper threshold and the lower threshold for an observable metrics. In case of dynamic threshold, the system may be configured to automatically determine upper threshold and/or lower threshold based on the analysis of historic metrics data and historic log data to generate and train machine learning models as described in various embodiments of the present disclosure.

In one or more embodiments, the remediation action module 258 may be configured to execute Remediation Action Plan for the anomaly detected by the metric processor 256. Based on the observation through the observable metrics for which an anomaly has been detected, the remediation action module 258 may determine appropriate Remediation Action Plan to be executed to resolve the anomaly. This will be triggered by an event when any anomaly is detected by the metric processor 256, and an anomaly message containing details of the anomaly and the resource observations (i.e., the values obtained for the observable metrics from the RPA components and the dependent components) for which the anomaly is raised may be received by the remediation action module 258. A Remediation Action Plan may comprise series of action steps which will be executed in sequence by the script execution engine 260 as configured. Each action is either linked with a script or a workflow in case of executing more complex orchestration logic. When the anomaly is detected by the metric processor 256, the remediation action module 258 may identify the remediation action plan to be executed by sending one or more instructions to the script execution engine 260. The Remediation Action Plan will start executing the action steps wherein each action steps contain details of the script/workflow to be executed.

The remediation action module 258 may send one or more instructions to the script execution engine 260 along with the script ID of the identified Remediation Action Plan, the observable metrics and the values, for example, component name, IP address and/or user credentials, so that script execution engine 260 execute the action steps centrally. The script execution engine 260 may fetch the script to be executed from the script repository 262 based on the script ID and then execute the actions steps which are part of fetched script which causes the script execution engine 260 to send one or more instructions to the RPA platform 202, which causes the resolution of anomaly detected in the RPA platform. In an example embodiment, the resolution (also termed as remediation) may indicate change in state of operation of resources—either to bring back the resource to a healthy state i.e., a state which will not violate/breach the defined threshold, or to start/restart the resource if the resource is shut down/non-functional. After the completion of all the action steps present in the script, a status is updated for the anomaly detected in the operations database 266 and a notification may be sent to the impacted parties/user. If the execution of remediation action plan fails in any of the action steps then the error message may be logged, status may be updated in the operations database 266 and a notification may be sent to the impacted user for manual intervention to resolve the anomaly.

In one or more embodiments, as a part of Remediation Action Plan, a root cause analysis may be performed by root cause identifier 268 to ascertain if the resource being monitored has raised an error or if there are any correlated errors identified from another resource which could be a potential root cause of the anomaly. It is to be observed that the log data of resources are also being monitored and log data being streamed into the log listener 226 are parsed, transformed, and sent to error classifier 270 to identify an error type based on the patterns identified during the training phase. A pattern may be identified by querying the dependency classification and error check API 250 which will verify if a log transaction extracted from log file/log data for a specific resource is a labelled error type by querying the error pattern extraction engine 242. The dependency classification and error check API 250 may also be configured to return details of potential root cause found in other dependent resources which may have been found to be highly correlated wherein such information is fetched by querying the error correlation engine 244. If an error type is identified, such information may be stored in the log and error database 272 as an error type for that particular resource. The remediation action module 258 may query the operations database 272 to check for errors in the resources (RPA components and its dependencies) and can either take action and resolve the issue; or report the additional information gathered as part of the root cause analysis and share the user as an incident ticket or notify over email for taking corrective action manually. It is to be observed that the log data may comprise information of RPA component but not the details of dependent RPA components which may be the root cause for anomaly in some cases. In such cases, the root cause identifier 268 may receive the information of resources and all its dependencies from RPA metadata configuration database 222.

In one or more embodiments, the analytics engine 210 may configured to receive data from resource environment baseline storage device 264, operation database 266 and root cause identifier 268 and may be configured to generate insights from the received data and display to the user through a display of a computing device either in the textual format or graphical format. The analytics engine 210 may be configured to notify user through a notification displayed at the computing device associated with the user when an anomaly is detected such as bots stopped running, bot running for long, VM is down, database not connecting, etc. Also, the analytics engine 210 may be configured to display the status of the remediation action performed. A notification module of the analytics engine 210 may recognize the type of notification to be sent, load the relevant notification template from a list of template documents stored in a database and fill the template with specific data of the relevant resource/observations/actions for the user. Further the dashboard/reports module of the analytics engine 210 may be configured to provide insight on the various operational dimensions of managing an RPA platform to the user.

Figure 3:
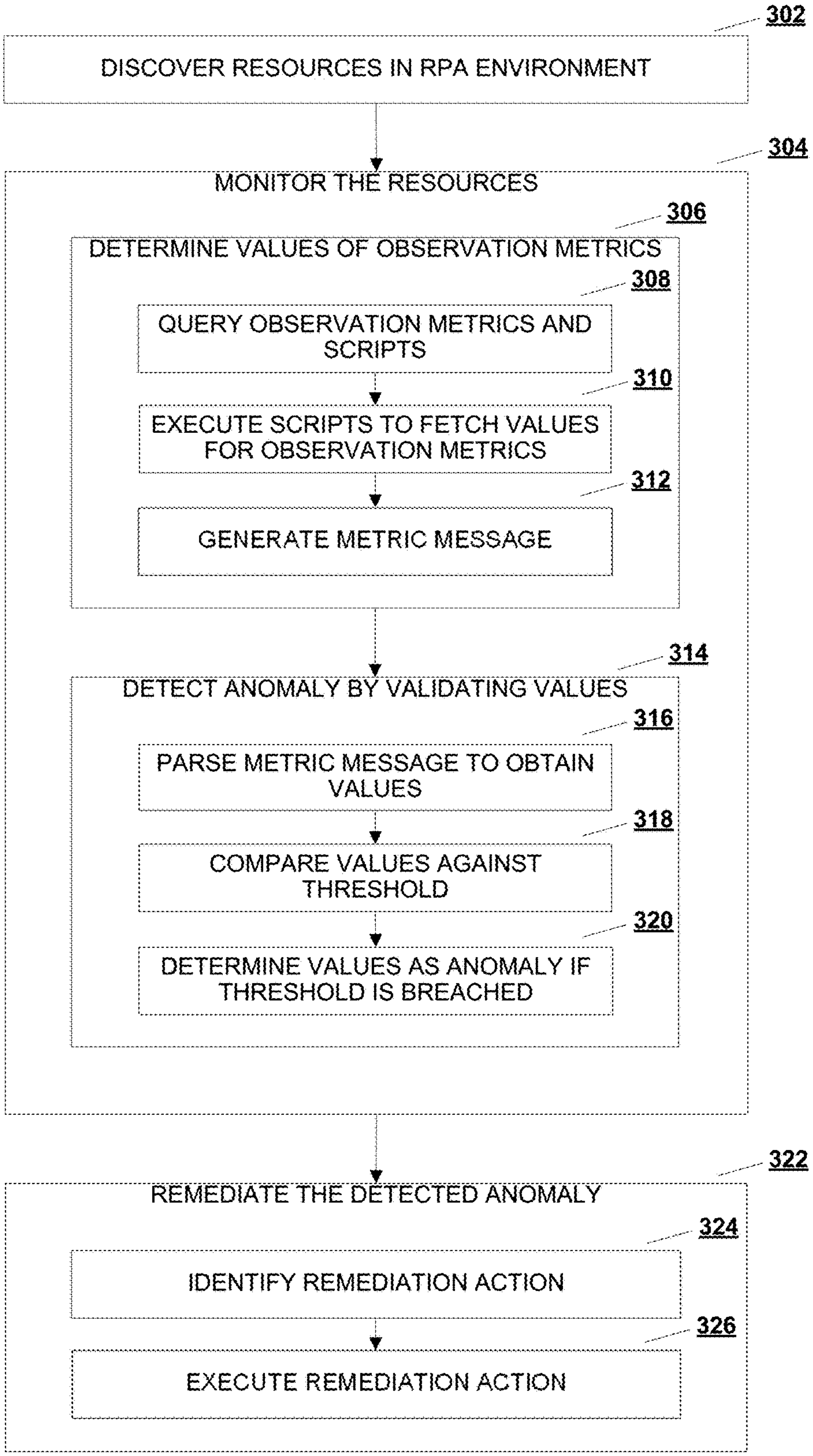
FIG. 3 is a process flow diagram illustrating sequence of steps executed by the system for automated detection and automated remediation of anomalies in a Robotic Process Automation (RPA) environment, according to one or more embodiments.

FIG. 3 is a process flow diagram illustrating sequence of steps executed by the system for automated detection and automated remediation of anomalies in a Robotic Process Automation (RPA) environment, according to one or more embodiments. In one or more embodiments the method comprising, discovering one or more resources in an RPA platform, as in step 302. The one or more resources may be RPA components and its dependent components that are installed/associated with the RPA platform within the RPA environment. Some of the examples of RPA components may be a Control Tower, a bot runner, bots etc. Exemplary dependent components may be Virtual machines (VMs), servers, infrastructure resources such as memory/storage devices and middleware such as web servers, database etc. Both the RPA component and the dependent components may together be termed as RPA resources (or 'resources').

The discovery process may automatically load/extract the attributes of RPA components and the dependent components by connecting with RPA platform 202 and querying the RPA components through RPA provided APIs or database and discover the various RPA components onboarded/installed in the RPA platform 202. The attributes (also referred as metadata configurations or metadata) of each of the discovered RPA components and dependent components may be such as, but not limited to bot name, bot location, server IP address, database IP address, connection string of database, Control Tower IP address, bot runner VM component details etc. which may be used for monitoring and remedial actions. The extracted attributes are stored in the RPA metadata configuration database. The discovered one or more resources on the RPA platform may be monitored, on various parameters which are termed as observables (or observation metrics), as in step 302. The monitoring of the one or more resources may be performed by determining values of one or more observation metrics from the one or more resources in the RPA platform as in step 306 and detecting at least one anomaly by validating the values of the one or more observation metrics, as in step 314.

In one or more embodiments, the determination of the values of the one or more observation metrics may comprise—querying the one or more observation metrics of the one or more resources from the database (RPA metadata configuration database 222) and at least one script associated with each of the one or more metrics from the script repository as in step 308. The one or more observation metrics may be such as, but not limited to, CPU utilization, Orchestrator, Check Robot Status, Service Status, Job Execution Time DB Server Status, bot queue length, bot completion time etc. which may be defined by the user during the onboarding process as described in previous paragraphs. The auto discovery process may help in identifying what all RPA components are installed in the RPA platform and based on which the user may define the observable metrics that needs to be considered while monitoring the one or more resources. As a part of onboarding process the system through configuration interface may allow user to define and configure at least one script as a part of Remediation Action Plan that needs to be executed in case of detection of anomalies in the function of one or more resources based on the observation metrics for each of the one or more resources that needs to be monitored. A Remediation Action Plan may be a single action step or series of action steps which the system will execute to resolve a particular anomaly. An action may be a script (set of instructions) or a workflow which may be fetched from a centralized script repository and the scripts are linked with the appropriate Remediation Action Plan. Once the Remediation Action Plans are defined, user can either map them to either observable metrics and store as observable metric remediation; or map them to error type and store as error type remediation. An exemplary mapping is illustrated in Table 1. The onboarding process and other pre-requisites for the system to begin with the monitoring process is described in various embodiments of the present disclosure.

After querying the one or more observation metrics and determining which script needs to be executed (which is identified through script ID), the system may execute the at least one script to fetch the values of the one or more observation metrics from the one or more resources as in step 310. In order to execute the script, the script ID may be communicated to the script execution engine which is configured to fetch the script from the script repository with the ID that was identified and execute the script. The script execution at the stage of monitoring will fetch the values for the observation metrics from the respective resources in the RPA platform. After obtaining values for the one or more observation metric a metric message may be generated comprising the values for each of the one or more observation metrics as in step 312. An exemplary metric message is illustrated in FIG. 3A. The monitoring may either be a scheduled monitoring or a triggered monitoring. After the monitoring, the anomalies may be detected by the system.

In one or more embodiments, to detect the at least one anomaly as in step 314 the metric message may be parsed to obtain values of the one or more observation metrics as in step 316. The obtained values of the one or more observation metrics may be compared against a threshold value for each of the one or more observation metrics as in step 318. As described in various embodiments of the present disclosure the threshold value may either be deterministic threshold that are defined by a user or the non-deterministic threshold that are determined by trained machine learning models. Some of the observation metrics may be assessed against a deterministic threshold and some may be assessed against a non-deterministic threshold, based on the mapping performed as a part of initial configuration. The value of the at least one of the one or more observation metrics may be determined as anomaly if the value of the at least one of the one or more observation metrics breach the threshold value as in step 320.

The detected at least one anomaly is remediated as in step 322 by identifying at least one automated remediation action (Remediation Action Plan) comprising sequence of instruction as in step 324. The information about which Remediation Action Plan needs to be executed for specific anomaly may be configured by the user as a part of onboarding process as illustrated in Table 1. Based on the mapping the system may automatically select the Remediation Action Plan and an at least one automated remediation action in terms of scripts may be identified, and the script ID of the identified script may be communicated to the script execution engine. The script execution engine may the fetch the script from the script repository and execute the identified at least one automated remediation action causing the remediation of the detected at least one anomaly, as in step 326. The identified script for the specific observation metric of the RPA component being monitored comprises instructions which causes the change in state of operation of the RPA component with respect to that specific observation metric. The script execution at the stage of remediation will resolve the anomaly. The execution of the identified at least one automated remediation action by the script execution engine, causes the script execution engine to send one or more instructions to that RPA component under monitoring to change the state of operation. For example, the remediation may indicate change in state of operation of resources—either to bring back the resource to a healthy state i.e., a state which will not violate/breach the defined threshold, or to start/restart the resource if the resource is shut down/non-functional.

In an example embodiment, consider an RPA component Virtual Machine (VM) is being monitored with 'memory consumption' as one of the observation metrics. Assume that the threshold is a deterministic threshold defined by the user as 75%. The user may also configure the Remediation Action Plan as which may reduce the 'memory consumption' by identifying other processes which can be paused or reduce the priority of execution or may be stopped too. These can be individual actions of same Remediation Action Plan. Alternatively, these can be individual Remediation Action Plan as configured by the user. With an assumption that the all the RPA components and dependent components have been onboarded as described in various embodiments of the present disclosure, the system may start monitoring the VM (The system may monitor all other resources that user has configured and for the example purpose VM may be considered) and continuously queries the RPA platform and/or underlying infrastructure (VM in the current example) on which the RPA component is running to fetch values for the 'memory consumption' metric by executing the script associated with the memory consumption. The response from the RPA platform may be received as metric message, which is then parsed to extract values of the 'memory consumption'. If the value is below threshold, the system may again monitor the 'memory consumption' metric of VM and it continues. It is to be noted that the system will be monitoring other observation metrics of same RPA component, if any, along with observation metrics of other RPA components simultaneously. If the value is more than the threshold, the mapped Remediation Action Plan may be executed to resolve the anomaly. It is to be noted that automated detection and automated remediation of anomaly is not just limited to VM, and VM is taken as example for easy understanding.

In another example embodiment, for the 'memory consumption' metric of the VM, a non-deterministic threshold may be determined by the system wherein the system learns it based on historical data. In such cases the threshold levels will be adaptive i.e., 75% may not be a threshold but may be below or above 75% which is determined by the threshold models that are built and trained, which causes the system to decide on the threshold levels dynamically. Based on the historical data, the system may learn that every Thursday around 1:00 PM to 2:00 PM, during the day, the memory utilization of VM is about 77%. So, the 77% utilization for this time is not to be considered as an anomaly and can be ignored without any specific action.

Figure 3E:
FIG. 3E illustrates a user interface to define error types and variable patterns, according to one or more embodiments.
Figure 3F:
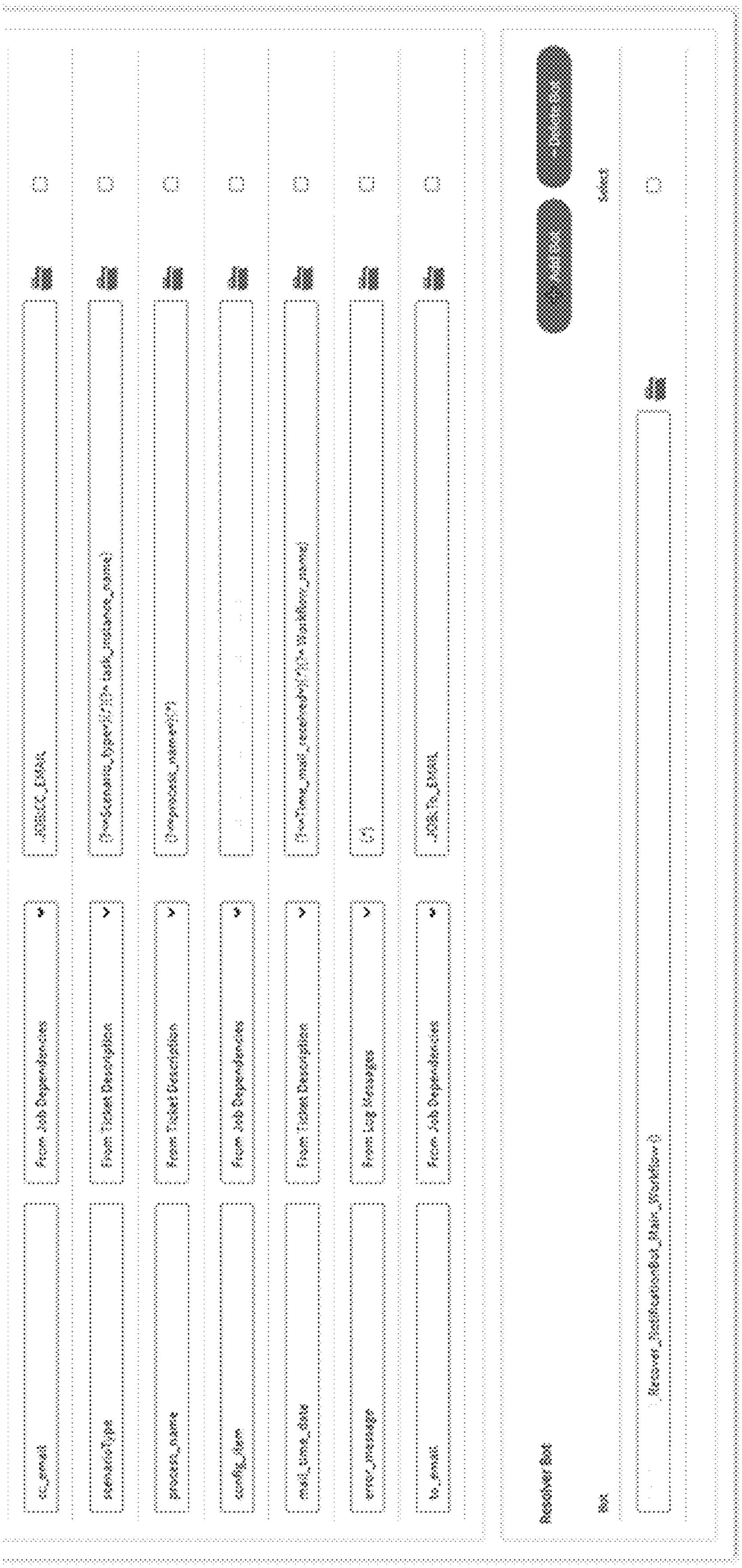
FIG. 3F is a continued screenshot of user interface illustrated in FIG. 3E, for mapping remediation action for the defined error type, according to one or more embodiments.

The steps of training machine learning models may comprise, receiving metrics data from metrics data store associated with the automation engine, attributes of the one or more resources from the RPA metadata configuration database and historic unstructured log data from log data store associated with the RPA platform. The attributes of the one or more resource may comprise information such as, but not limited to, bot name, bot location, server IP address, database IP address, connection string of database, Control Tower IP address, bot runner VM component details etc. An exemplary historic unstructured log data is illustrated in FIG. 3B. The metrics data and the historic unstructured log data may be converted to a structured format data by applying transformation/aggregate functions to prepare data for model training. One or more error patterns from the structured format data may be extracted using regex rules for error pattern detection. The regex rules may be either static regex rules that are pre-defined by the user or dynamic regex rules wherein the system is able to automatically extract error patterns, for example, using longest common sequence algorithm. The extracted error patterns may be provided as input to the to train the machine learning models. The steps of training machine learning models are described in detail in previous paragraphs in relation to model training engine 206 in FIG. 2. FIG. 3C illustrates an exemplary error patterns, regular expressions to identify error patterns and the respective log files from where the error patters are extracted. FIG. 3D, FIG. 3E and FIG. 3F, illustrates user interface provided by the system for the user to configure the error type (for Error Example 1 mentioned in FIG. 3C) and remedial action to be taken when such as an error is detected. As illustrated in FIG. 3D, the user will be able to see the error pattern that has been identified by the system in the log file and this interface may be used by the user to define an error type (For example, Recover_WF) as illustrated in FIG. 3E which will be raised by the system whenever such pattern is detected in log files in the future. The interface also provides an option to specify the remedial action/self-healing action (by configuring a resolver bot) to be taken by the system to remediate the issue when the specific error type has been detected as illustrated in FIG. 3F. The variable patterns illustrated in FIG. 3E and FIG. 3F may be extracted from the log data or the metadata which helps in identifying which metadata is required (for example, what is the name of the RPA component, where in the RPA component running, to whom or which mail ID a notification needs to be sent after remediation etc.) to perform remediation action by the system. As mentioned in the FIG. 3F, the variable patterns are provided as input to the resolver bot Recover_NotificationBot_Main_Workflow( ) which is further passed to script execution engine to perform remediation action as described in various embodiments of the present disclosure.

Figure 4A:
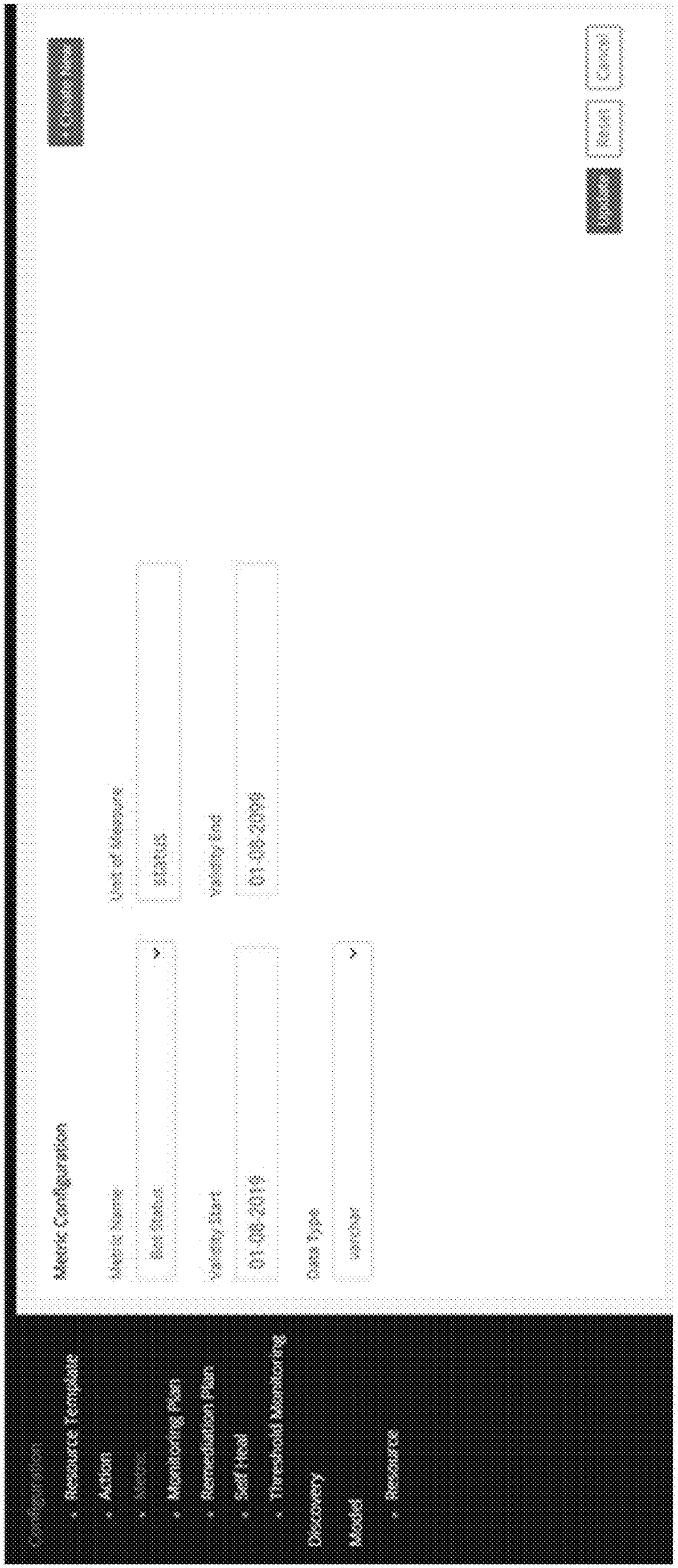
FIG. 4A is a screenshot illustrating the metric configuration interface, according to one or more embodiments.

FIG. 4A is a screenshot illustrating the metric configuration interface to configure monitoring of an RPA component i.e., a bot, according to one or more embodiments. The system through the configuration interface may allow user to define and configure an observation metric by providing a metric name for monitoring the bot installed on the RPA platform. As illustrated, the observation metric created in the illustration is 'Bot Status' along with defining the validity of the observation metric and the datatype of value it returns from the RPA platform during the monitoring process.

Figure 4B:
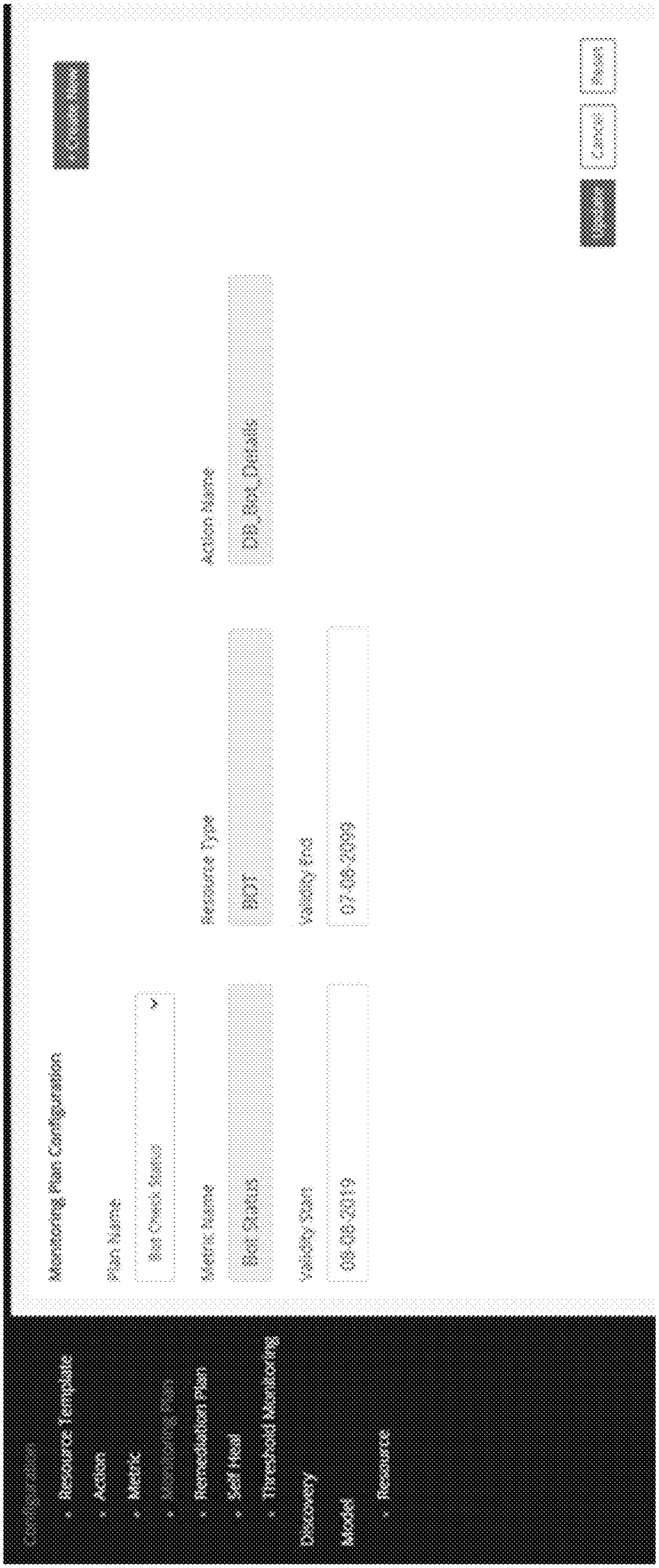
FIG. 4B is a screenshot illustrating monitoring plan configuration interface, according to one or more embodiments.

FIG. 4B is a screenshot illustrating monitoring plan configuration interface for creating a monitoring plan 'Bot Check Status' for the observation metric 'Bot Status' through configuration interface, according to one or more embodiments. The interface for creating a monitoring plan allows user to define the resource type which is 'bot' and the action name 'DB Bot Details' which is configured to get the details of the 'bot'.

Figure 4C:
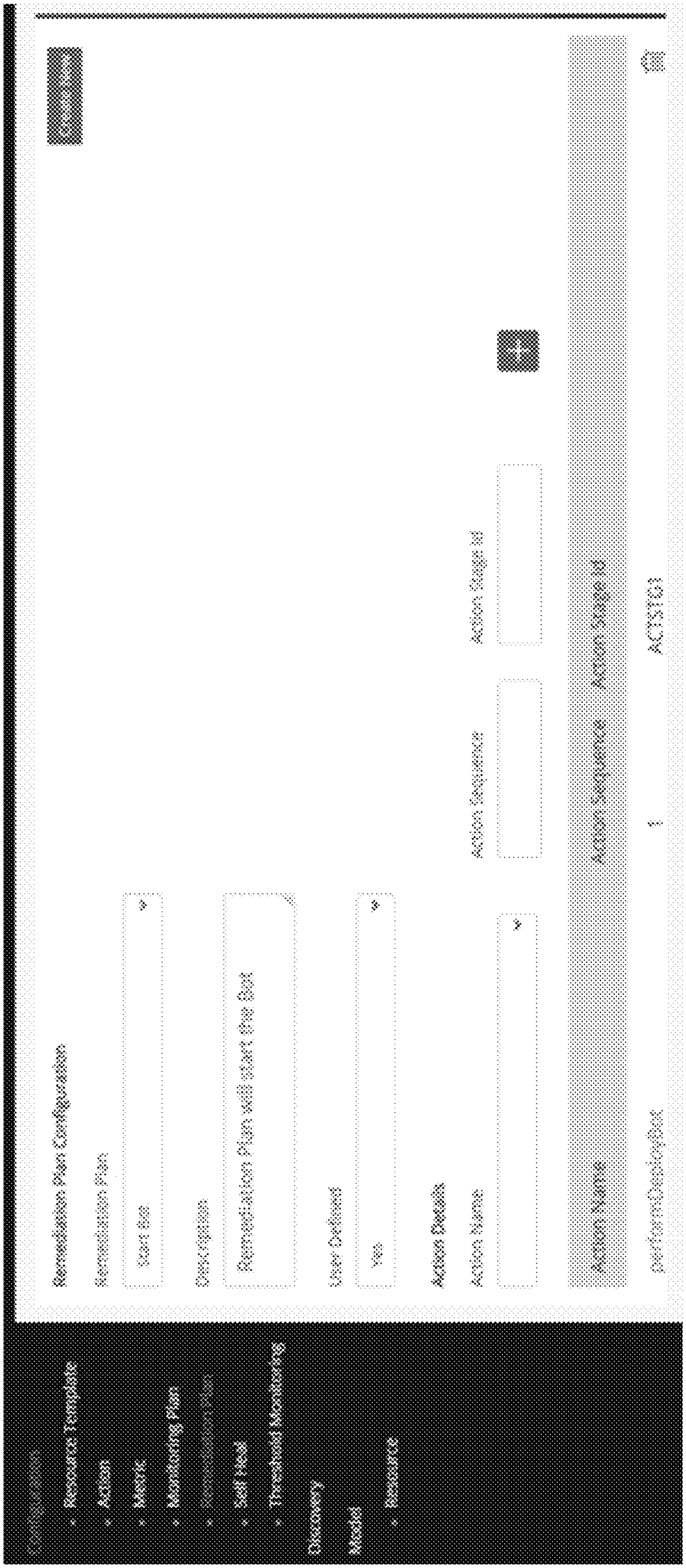
FIG. 4C is a screenshot illustrating remediation plan configuration interface, according to one or more embodiments.

FIG. 4C is a screenshot illustrating remediation plan configuration interface for creating a remediation plan 'Start Bot' for the RPA component 'Bot' in relation to metric 'Bot Status' under the monitoring plan 'Bot Check Status', according to one or more embodiments. As illustrated in the screenshot, the configuration interface may allow user to create plurality of remediation plans and map the scripts (Actions) that needs to be executed to achieve the remediation plan i.e., to automatically fix/resolve any issues or anomalies by the system.

Figure 4D:
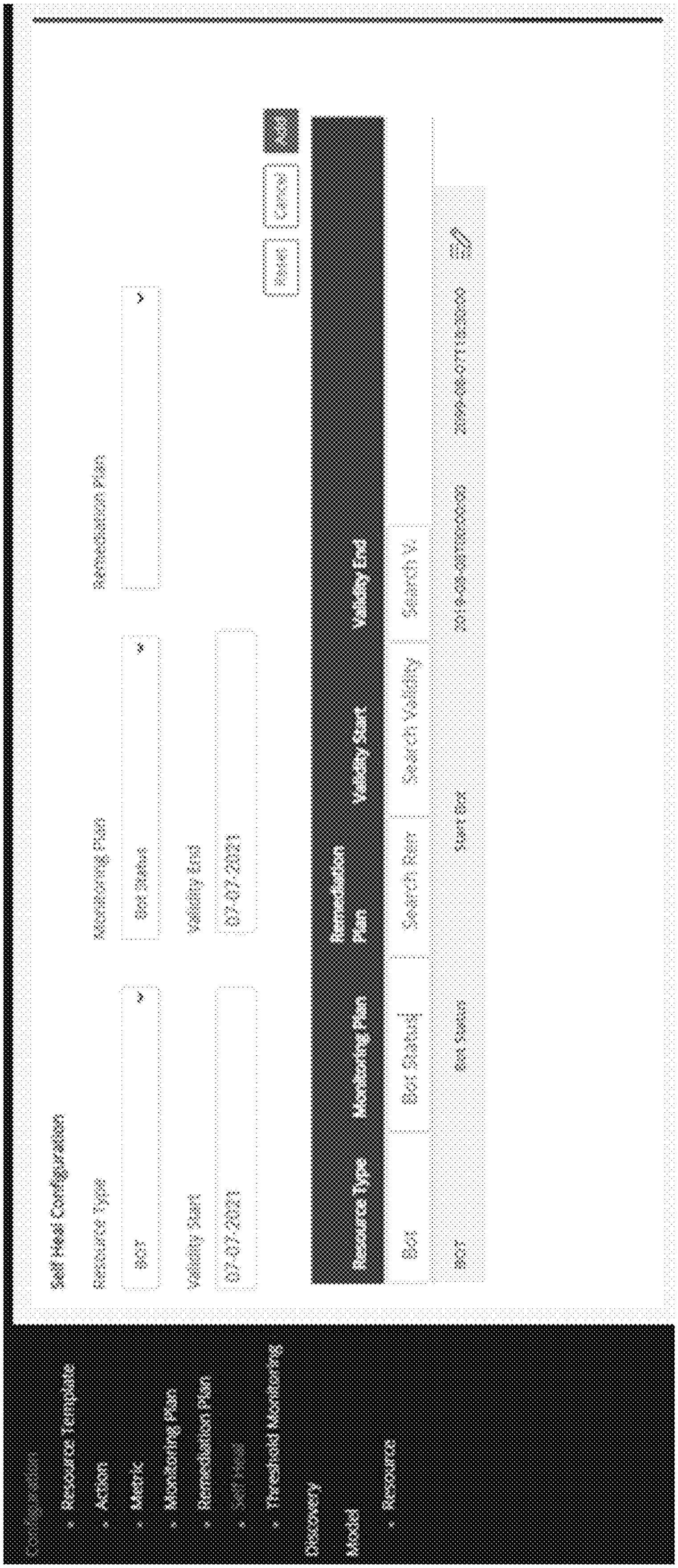
FIG. 4D is a screenshot illustrating self-heal configuration interface, according to one or more embodiments.

FIG. 4D is a screenshot illustrating self-heal configuration interface for configuring a Remediation Action Plan (self-heal configuration), according to one or more embodiments. As illustrated in the screenshot, the resource is 'Bot', with the monitoring plan 'Bot Status' and the remediation plan being 'Start Bot'. The configuration interface may allow user to add/modify healing configuration by way of mapping of particular resource/metric and its respective remediation plan/actions to cause self-heal/resolution of anomaly.

Figure 4E:
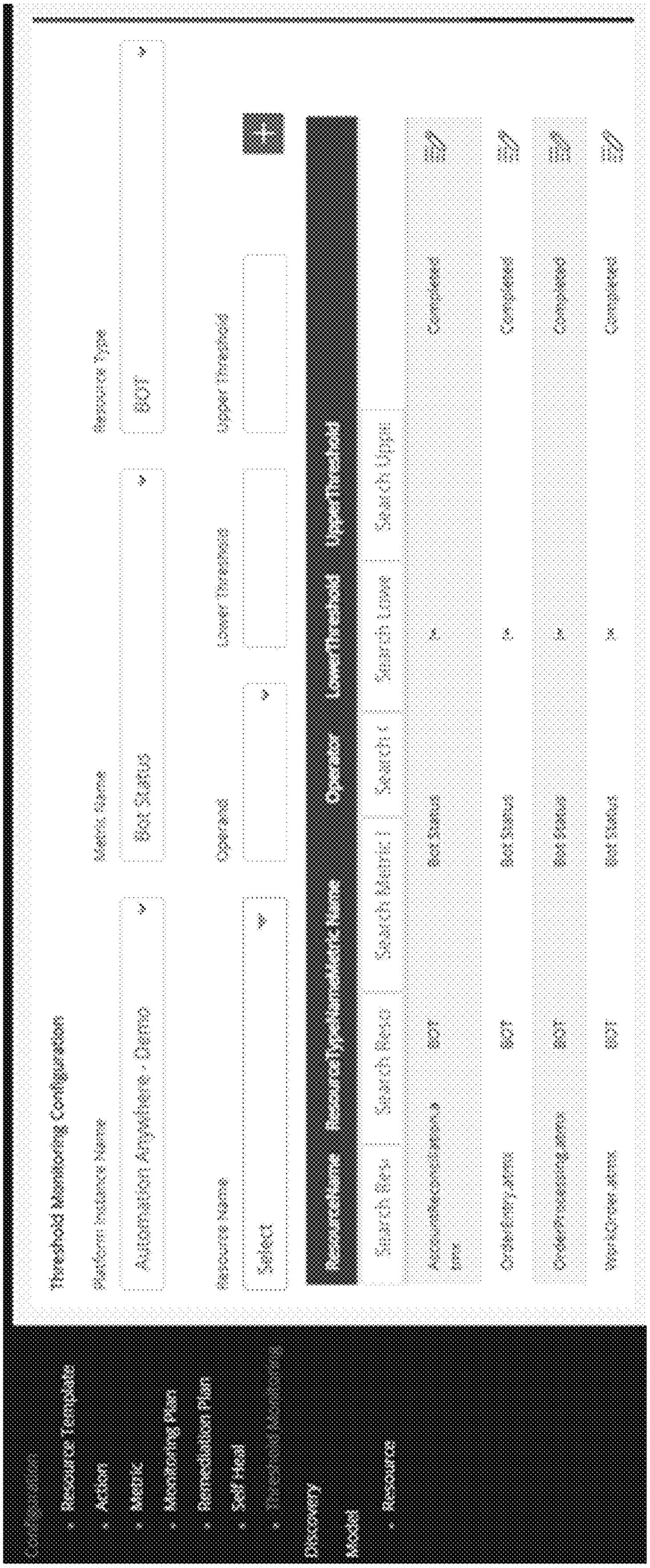
FIG. 4E is a screenshot illustrating threshold monitoring configuration interface, according to one or more embodiments.

FIG. 4E is a screenshot illustrating threshold monitoring configuration interface for configuring anomalies, according to one or more embodiments. As illustrated in the screenshot, the configuration interface may allow user to select the platform that is to be monitored, the observation metric and the RPA component (resource type) that needs to be monitored. The threshold monitoring configuration interface may allow user to configure the anomaly detection rule(s) for a particular resource. For a particular resource, an expression is constructed by specifying a defined metric followed by the operator expression to evaluate the operand value against the threshold value. The user may also construct an anomaly rule by chaining a series of expression such as Bot Status!=Completed AND Completion Time (mins)>5.0. The user may also define the upper threshold and lower threshold for a particular observation metric like 'Bot Status' as illustrated in the screenshot.

Figure 4F:
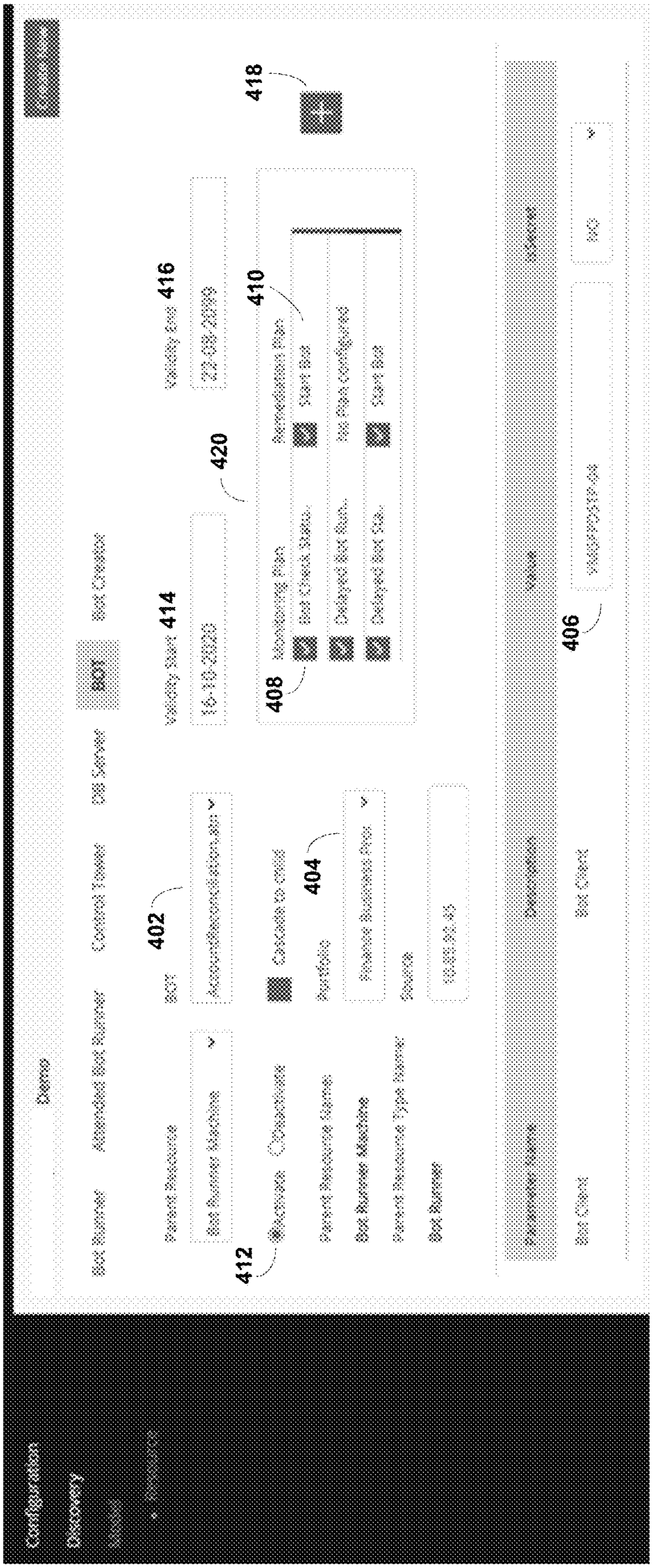
FIG. 4F is a screenshot illustrating an interface to provide the complete Resource Model view of a typical RPA platform instance, according to one or more embodiments.

FIG. 4F is a screenshot illustrating an interface to provide the complete Resource Model view of a typical RPA platform instance, according to one or more embodiments. The interface provides a detailed view of all the key RPA/IT resources which constitutes an RPA platform such as Control Tower, Bots, Bot Runners, Servers, Database etc. along with their interdependencies. Each resource will have attributes based on the resource type to which resource belongs. In this interface, a user can observe the interdependencies defined. For example, a Bot—AccountReconcilation.atmx (402) is part of the Portfolio—Finance Business Process (404) and child of Bot Runner—VMGFPDSTP (406). For the Bot resource—AccountReconcilation.atmx, there are monitoring, and remediation plans defined, e.g. —For Monitoring Bot Check Status (408), a remediation plan by the name 'Start Bot' (410) has been configured. Resource attributes which may be referred in the monitoring or remediation plans are listed along with values e.g. Bot client. Further the interface comprises the option to activate/deactivate a resource monitoring either explicitly setting the appropriate property (412) or by defining a pre-defined validity period (Validity start date 414 and Validity end date 416). Some of the functionalities through the illustrated interface are—(a) User can activate/de-activate any specific Resource (412); (b) User can add resource, click on plus icon (418) and a popup will be displayed with three options—(i) Add Parameter; (ii) Add Resource; and (iii) Add Observable-Remediation plan; (c) User can Select/Deselect (420) the Observable-Remediation plan; and/or (d) User can Update the exist parameter values.

In one or more embodiments, a non-transitory computer readable storage medium for automated detection and automated remediation of anomalies in a Robotic Process Automation (RPA) environment is disclosed. The non-transitory compute readable storage medium comprising machine executable code which when executed by at least one processor, causes the at least one processor to perform steps such as, discovering one or more resources in an RPA platform. The discovered one or more resources on the RPA platform may be monitored, wherein the monitoring comprises—determining values of one or more observation metrics from the one or more resources in the RPA platform; and detecting at least one anomaly by validating the values of the one or more observation metrics. The determination of the values of the one or more observation metrics comprises, querying the one or more observation metrics of the one or more resources and at least one script associated with each of the one or more metrics; executing the at least one script to fetch the values of the one or more observation metrics from the one or more resources; and generating a metric message comprising the values for each of the one or more observation metrics. The detection of the at least one anomaly, comprising, parsing the metric message to obtain values of the one or more observation metrics; comparing the values of the one or more observation metrics against a threshold value for each of the one or more observation metrics; and determining the values of the one or more observation metrics as anomaly if the values of the one or more observation metrics breach the threshold value.

The threshold value may either be a deterministic threshold value or non-deterministic threshold value, wherein the deterministic threshold value may be defined by a user and non-deterministic threshold may be determined by trained machine learning models. The detected at least one anomaly may be remediated by identifying at least one automated remediation action comprising sequence of instructions and executing the identified at least one automated remediation action causing the remediation of the detected at least one anomaly. The steps of training machine learning models may comprise, receiving metrics data from metrics data store and historic unstructured log data from log data store; converting the metrics data and the historic unstructured log data to a structured format data; extracting error patterns from the structured format data; and providing the extracted error patterns as input to the machine learning models to train the machine learning models.

The disclosed automated system, method and/or non-transitory computer readable storage medium for detection and remediation of anomalies in Robotic Process Automation environment addresses the problem in the present technology by moving from reactive to proactive approach of managing RPA platforms. The disclosed system will have a complete end-to-end visibility of the health status of all RPA components and their dependencies, proactively detect anomalies in any monitoring parameter or logs and then take corrective automation actions to bring back any non-working, unhealthy RPA component or its dependencies into a working, healthy state. The system continuously monitors RPA platforms and its dependent ecosystem, diagnoses the failure of RPA components and promptly execute the remediation action to resolve the issue and notify the respective team about the failure and action taken against those failure in the shortest possible time to minimize disruptions on operations in any Robotic Process Automation environment.

The specification and drawings in the present disclosure are to be regarded in an illustrative rather than a restrictive sense.

What is claimed is:

1. A computer implemented method for automated detection and automated remediation of anomalies in a Robotic Process Automation (RPA) environment, comprising:

discovering, by at least one processor, one or more resources in an RPA platform, wherein the one or more resources comprise one or more RPA components and one or more dependent components corresponding to the one or more RPA components associated with the RPA platform, wherein the one or more RPA components comprise one or more of: a control tower, a bot runner, and a bot, and wherein the discovering comprises:

loading, by the at least one processor, attributes of the one or more RPA components and the one or more dependent components by connecting to the RPA platform, and querying, by the at least one processor, the one or more RPA components through RPA-provided Application Program Interfaces (APIs) or a database for discovering the one or more RPA components onboarded or installed in the RPA environment;

receiving, by the at least one processor, metrics data from a metrics data store and historic unstructured log data from a log data store, wherein the metrics data comprises one or more observation metrics of one or more resources in the RPA platform;

converting, by the at least one processor, the metrics data and the historic unstructured log data into a structured format comprising normalized log fields corresponding to error events;

extracting, by the at least one processor, recurring error patterns comprising temporally correlated sequences of the error events;

training, by the at least one processor, one or more machine learning models using the extracted recurring error patterns as labeled error-pattern training data and the structured format as feature input data, wherein the training associates the error patterns with corresponding ranges of the one or more observation metrics;

computing, by the at least one processor, a dynamic threshold value corresponding to each of the one or more observation metrics using the trained one or more machine learning models;

monitoring, by the at least one processor, the discovered one or more resources in the RPA platform, the monitoring comprising:

determining, by the at least one processor, values of the one or more observation metrics from the one or more resources in the RPA platform; and detecting, by the at least one processor, at least one anomaly by validating the values of the one or more observation metrics based on the dynamic threshold value corresponding to each of the one or more observation metrics; and remediating, by the at least one processor, the detected at least one anomaly, the remediating comprising:

identifying, by the at least one processor, at least one automated remediation action comprising a sequence of instructions; and executing, by the at least one processor, the identified at least one automated remediation action causing the remediation of the detected at least one anomaly.

2. The computer implemented method of claim 1, wherein determining the values of the one or more observation metrics further comprises:

querying, by the at least one processor, the one or more observation metrics of the one or more resources; and generating, by the at least one processor, a metric message comprising the values of the one or more observation metrics.

3. The computer implemented method of claim 1, wherein detecting the at least one anomaly by validating the values of the one or more observation metrics further comprises:

parsing, by the at least one processor, a metric message to extract values of the one or more observation metrics from the metric message;

comparing, by the at least one processor, the extracted values against the dynamic threshold value; and determining, by the at least one processor, the extracted values as an anomaly when the extracted values of the one or more observation metrics breach the dynamic threshold value.

4. The computer-implemented method of claim 1, wherein:

the dynamic threshold value is configured to adapt over time; and the at least one automated remediation action is mapped to the one or more observation metrics or one or more corresponding error types of the error events.

5. A system for automated detection and automated remediation of anomalies in a Robotic Process Automation (RPA) environment, comprising:

at least one processor; and at least one memory unit operatively coupled to the at least one processor, having instructions stored thereon that, when executed by the at least one processor, causes the at least one processor to:

discover one or more resources in an RPA platform, wherein the one or more resources comprise one or more RPA components and one or more dependent components corresponding to the one or more RPA components associated with the RPA platform, wherein the one or more RPA components comprise one or more of: a control tower, a bot runner, and a bot, and wherein to discover the one or more resources the at least one processor is caused to:

load attributes of the one or more RPA components and the one or more dependent components by connecting to the RPA platform, and query the one or more RPA components through RPA-provided Application Program Interfaces (APIs) or a database for discovering the one or more RPA components onboarded or installed in the RPA environment;

receive metrics data from a metrics data store and historic unstructured log data from a log data store, wherein the metrics data comprises one or more observation metrics of one or more resources in the RPA platform;

convert the metrics data and the historic unstructured log data into a structured format comprising log fields corresponding to error events;

extract recurring error patterns, comprising temporally correlated sequences of the error events, from the converted historic unstructured log data;

train one or more machine learning models, using the extracted recurring error patterns as labeled error-pattern training data and the structured format as feature input data, wherein the training associates the error patterns with corresponding ranges of the one or more observation metrics;

compute a dynamic threshold value corresponding to each of the one or more observation metrics using the trained one or more machine learning models;

monitor the discovered one or more resources in the RPA platform, wherein to monitor the discovered one or more resources, the at least one processor is caused to:

determine values of the one or more observation metrics from the one or more resources in the RPA platform; and detect at least one anomaly by validating the values of the one or more observation metrics based on the dynamic threshold value corresponding to each of the one or more observation metrics; and remediate the detected at least one anomaly, wherein to remediate the detected at least one anomaly, the at least one processor is further caused to:

identify at least one automated remediation action comprising sequence of instructions; and execute the identified at least one automated remediation action causing the remediation of the detected at least one anomaly.

6. The system of claim 5, wherein to determine the values of the one or more observation metrics, the at least one processor is caused to:

query the one or more observation metrics of the one or more resources; and generate a metric message comprising the normalized values of the one or more observation metrics.

7. The system of claim 5, wherein to detect the at least one anomaly by validating the values of the one or more observation metrics, further comprises instructions stored thereon that, when executed by the at least one processor, causes the at least one processor to:

parse a metric message to extract values of the one or more observation metrics from the metric message;

compare the extracted values against the dynamic threshold value; and determine the extracted values as an anomaly when the extracted values of the one or more observation metrics breach the dynamic threshold value.

8. The system of claim 5, wherein:

the dynamic threshold value is configured to adapt over time; and the at least one automated remediation action is mapped to the one or more observation metrics or one or more corresponding error types of the error events.

9. A non-transitory computer readable medium having stored thereon instructions for automated detection and automated remediation of anomalies in a Robotic Process Automation (RPA) environment, the non-transitory computer readable medium comprising machine executable code which when executed by at least one processor, causes the at least one processor to perform steps comprising:

discovering one or more resources in an RPA platform, wherein the one or more resources comprise one or more RPA components and one or more dependent components corresponding to the one or more RPA components associated with the RPA platform, wherein the one or more RPA components comprise one or more of: a control tower, a bot runner, and a bot, and wherein the discovering comprises:

loading, by the at least one processor, attributes of the one or more RPA components and the one or more dependent components by connecting to the RPA platform, and querying, by the at least one processor, the one or more RPA components through RPA-provided Application Program Interfaces (APIs) or a database for discovering the one or more RPA components onboarded or installed in the RPA environment;

receiving metrics data from a metrics data store and historic unstructured log data from a log data store, wherein the metrics data comprises one or more observation metrics of one or more resources in the RPA platform;

converting, by the at least one processor, the metrics data and the historic unstructured log data into a structured format comprising log fields corresponding to error events;

extracting, by the at least one processor, recurring error patterns, comprising temporally correlated sequences of the error events from the converted historic unstructured log data;

training, by the at least one processor, one or more machine learning models using the extracted recurring error patterns as labeled error-pattern training data and the structured format as feature input data, wherein the training associates the error with corresponding ranges of the one or more observation metrics;

computing a dynamic threshold value corresponding to each of the one or more observation metrics using the trained one or more machine learning models;

monitoring the discovered one or more resources in the RPA platform, the monitoring comprising:

determining values of the one or more observation metrics from the one or more resources in the RPA platform; and detecting at least one anomaly by validating the values of the one or more observation metrics based on the dynamic threshold value corresponding to each of the one or more observation metrics; and remediating the detected at least one anomaly, the remediating comprising:

identifying at least one automated remediation action comprising sequence of instructions; and executing the identified at least one automated remediation action causing the remediation of the detected at least one anomaly.

10. The non-transitory computer readable medium of claim 9, further comprising machine executable code which when executed by at least one processor, causes the at least one processor to perform steps for determining the values of the one or more observation metrics, the steps comprising:

querying, by the at least one processor, the one or more observation metrics of the one or more resources;

and generating, by the at least one processor, a metric message comprising the values of the one or more observation metrics.

11. The non-transitory computer readable medium of claim 9, further comprising machine executable code which when executed by at least one processor, causes the at least one processor to perform steps for detecting the at least one anomaly by validating the values of the one or more observation metrics, the steps comprising:

parsing, by the at least one processor, a metric message to extract values of the one or more observation metrics from the metric message;

comparing, by the at least one processor, the extracted values against the dynamic threshold value;

and determining, by the at least one processor, the extracted values as an anomaly when the extracted values of the one or more observation metrics breach the dynamic threshold value.

* * * * *